United States Patent [19]

Kuijsten

[11] 3,757,097

[45] Sept. 4, 1973

[54] EXTRA BIT FOR FLOATING DECIMAL CONTROL AND CORRECTION OF FALSE INTERMEDIATE ARITHMETIC RESULTS

[75] Inventor: Han Kuijsten, Oakland, Calif.

[73] Assignee: SCM Corporation, New York, N.Y.

[22] Filed: Mar. 29, 1971

[21] Appl. No.: 129,100

[52] U.S. Cl. .................................. 235/159, 235/170
[51] Int. Cl. ............................ G06f 7/50, G06f 7/54
[58] Field of Search ...................... 235/159, 170, 169

[56] References Cited

UNITED STATES PATENTS

| | | | |
|---|---|---|---|
| 3,391,391 | 7/1968 | Simpson, Sr. | 340/172.5 |
| 3,454,750 | 7/1969 | Shimabukuro | 235/159 |
| 3,521,043 | 7/1970 | Thompson | 235/170 |
| 3,539,790 | 10/1970 | Shimabukuro | 235/159 |
| 3,548,180 | 12/1970 | Angelov et al. | 235/159 |
| 3,571,582 | 3/1971 | Kelling | 235/170 |
| 3,621,219 | 11/1971 | Washizoka | 235/170 |

*Primary Examiner*—Eugene G. Botz
*Assistant Examiner*—David H. Malzahn
*Attorney*—Armand G. Guibert

[57] ABSTRACT

A floating decimal calculator with controls for decimal location and for correction of falsely-coded sums or differences developed during any of the four basic arithmetic operations, these controls being based on utilization of a fifth bit position at each digit location in the registers of the calculator for these two purposes.

36 Claims, 17 Drawing Figures

PATENTED SEP 4 1973

3,757,097

SHEET 01 OF 13

INVENTOR
HAN KUIJSTEN

BY Armand G. Guibert
AGENT

| KEY | CODE |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

INVENTOR.
HAN KUIJSTEN

INVENTOR.
HAN
KUIJSTEN

INVENTOR.
HAN KUIJSTEN

HAN INVENTOR. KUIJSTEN

INVENTOR.
HAN KUIJSTEN

INVENTOR.
HAN KUIJSTEN

INVENTOR.
HAN KUIJSTEN

EXTRA BIT FOR FLOATING DECIMAL CONTROL AND CORRECTION OF FALSE INTERMEDIATE ARITHMETIC RESULTS

BACKGROUND OF THE INVENTION

This invention relates to a calculating device and particularly to a very small electronic calculator, able to perform the four basic arithmetic operations of addition, subtraction, multiplication, and division.

While electronic calculating machines are well known, many of them are very large devices, taking up far too much room to enable their use on the top of a desk. Even the smaller electronic calculators that can fit on a desk tend to be cumbersome and quite expensive, due to the number of circuit elements required. This invention relates particularly to features that reduce circuit complexities and enable practical production of a very small desk calculator — taking up less than a square foot of space and less than 2 inches thick, yet electronically operated either by batteries or by cord power, and rapid and versatile.

An important feature of the invention is its incorporation of a special fifth bit for each digit in each of the registers. This fifth bit is used for two main purposes: (1) location and indication of the decimal points and (2) for carrying and borrowing from one digit to the next. The use of this fifth bit has unexpected consequences in enabling considerable simplification of the calculating circuits.

Others have used ordinally located bits for decimal points, but heretofore when this has been done (U.S. Pat. Nos. 2,141,597; 2,853,696 2,947,748 and 3,391,391 German Pat. No. 1,112,744), the extra bit has been usable for nothing else. Also, the circuits required in conjunction with the decimal point have been either unduly complicated or less versatile than desired.

Another problem concerned with decimal points is that universally met in multiplication and division, where the decimal point must be properly relocated instead of merely being aligned and retained in alignment, as in addition and subtraction. Such relocation in the past has required special counters, for instance, hence the invention is directed to simplification of that problem also.

Thus, some of the most significant parts of the invention relate to the decimal point, the means by which it is entered, the means by which it is stored, and the means by which the decimal point is properly located after multiplication and division. Other important features of the invention relate to the use of the same fifth bit position for carrying and borrowing from one digit to the next and, in combination with (though not limited to) an excess-three system of binary coding, relate to correction of each modified digit after each addition or subtraction to retain the proper code structure.

BRIEF SUMMARY OF THE INVENTION

The invention incorporates for each digit of each register five binary bits, instead of the four bits which are sufficient for any digit in the decimal system. The fifth bit has dual use: it is used to store a "1" when a decimal point is to appear immediately to the right of that digit in the display; it is used for carrying and borrowing, in conjunction with an excess-three system of coding (or other binary coded decimal system), which the fifth bit makes feasible. Simplified circuits can be obtained by the five-bit per digit system which would not be obtainable with a four-bit system, and the result is that, while there is an additional bit at each digit, there are actually fewer total circuit elements for doing the same number of tasks. An auxiliary feature of the invention is that if the operator enters no decimal point, because the number is intended to be integer, the machine automatically enters a decimal point at the extreme right digit. This, of course, is important in alignment of integral numbers with numbers that include decimal fractions, and it is also important for obtaining the correct location of the decimal point in a product or quotient. The operation is entirely electronic and may employ complex integral circuits or circuit chips to give very great miniaturization with adequate speed and complete accuracy.

There are advantages in this five-bit system during shifting operations, for the decimal is shifted with the register contents without special additional hardware and without more shifting equipment than would be necessary to shift the digits. In more conventional storage, of the floating decimal type — such as that in U.S. Pat. No. 2,538,636, for example — a separate set of bit positions contains th decimal point information as a binary code of value, and each shift has to be accompanied (either concurrently or at conclusion of all shifts) by unit incrementation or decrementation in the coded value. The use of a fifth bit position for decimal storage is known, as mentioned previously, but its implementation according to this invention yields further advantages in simplicity and, therefore, low cost.

Presence of the fifth bit position simplifies addition/-subtraction. In a binary coded decimal machine, with a bit serial, digit serial memory organization, addition introduces four bits of delay as it is necessary to wait until all four bits have been added to determine what the correction should be. As most commands exist only for one machine cycle, this delay for correction creates a problem requiring advance knowledge of the operation to be performed, and register taps to allow "early" connection of the adder, or delay of the command and additional register inputs to allow "late" storage of information. In either case, the adder circuitry is more complex, requiring two full adders and a carry flip-flop. By postponing correction to a larger register cycle, the above-mentioned complexities are not required, but a memory is required with one bit per digit capacity for storage of carry-borrow information. The fifth bit is ideally suited to serve this purpose.

Briefly, the operation is as follows: During a first cycle of an adding or subtracting operation, the digit carry-borrow signal is recorded in the fifth bit, while the uncorrected sum or difference is stored in the normal four bits for each digit, the term "uncorrected" is used because the combination of two binary coded decimal (or other) digits results in a false value in many instances, a value not corresponding to the code and thus requiring correction. During a second adder cycle, this correction of each digit is performed according to the value of the fifth bit. This scheme is exceptionally useful in combination with the excess-three code because than the digit carry and the carry out of the sum of the fourth bits are identical, but it will be obvious that it could be used with other four-bit codes, though perhaps not as simply. In normal BCD, for instance, the digit carry is not always accompanied by a fourth bit carry. Thus, in the most common BCD (1-2-4-8 binary coded decimal system), 9 + 1 = 10 is coded as 1001 plus 0001 equals 1010 with no carry, the same being true for any digit pairs whose sum is 10 to 15, and gating being required to detect these particular combinations and generate a carry together with a correction. In the excess-three system, it is coded as 1100 plus 0100 equals a carry and 0000, correction to excess-three code always being necessary, but the actual process being dependent on the presence or absence of the carry.

During the add operation, the use of the fifth bit for carry storage in the accumulator renders that position unavailable for decimal storage; however, during an accumulation this is no problem, for the decimal value is available in the register containing the addend (or subtrahend, as the case may be), the contents of the two registers having been aligned before the addition (subtraction) could take place and so the decimal point can be dropped from one register and still be available from the other for ultimately properly pointing off the corrected sum or difference.

During multiplication and division, a new decimal point has to be calculated, as three registers are involved in these algorithms and only one register is needed for the correction storage, no problem is presented and decimal point location based on entry of markers in the fifth bit of one digit position permits simple implementation of the necessary controls.

In the flow diagrams, the boxes represent sequence states in which the indications actions take place under the conditions given, while a diamond represents branch points controlling the sequence path according to the "truth" of the indicated condition, and inverted triangles represent performance of the indicated action during transition from a given state. In the logic diagrams, the hemispheres represent gates, an internal dot signifying an AND gate, an internal "plus" signifying an OR gate, a tangential circle on the input or output side of a gate indicating signal inversion (a "NOR" or "NAND" gate) and a large arrowhead with a circle at the tip indicating an inverter. The particular elements chosen for the embodiment described herein were selected for simplicity of explanation, it being recognized that equivalent results can be obtained by inversion of signals and use of NOR/NAND logic where it suits a designer's needs under restrictions of cost, size, etc. The blocks labeled "Stream Selectors" comprise "Mutually Exclusive" combinations of gates, the simplest form being a NOR gate and an AND gate having separate data inputs and a common control and their outputs connected to another NOR gate ("Exclusive OR" gates also "select"), such that only one data input will be permitted to pass, others being blocked. In some cases, AND gates, marked S, of the stream selector are shown separately from the stream selector, for ease of explanation.

DESCRIPTION OF A PREFERRED EMBODIMENT

Figure 1:
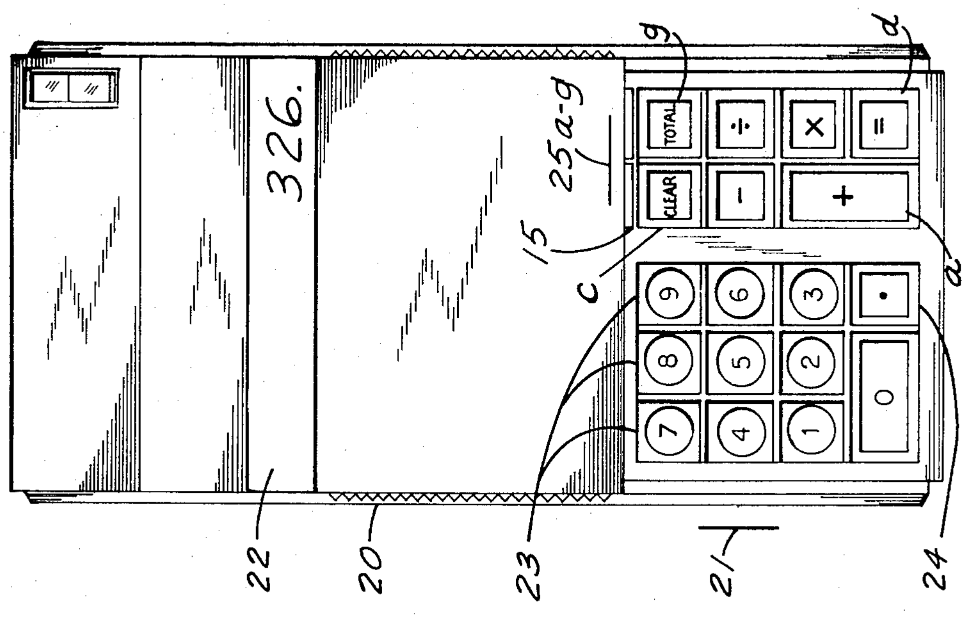
FIG. 1 is a top plan view of a miniature electronic calculator embodying the principles of the invention, including a keyboard and visual display (printed output could be provided, of course), the keyboard having the digit and decimal point entry keys on the left side and the function keys on the right side.

The Keyboard (FIG. 1)

A calculator 20 embodying the principles of the invention can be quite small, not much larger than its illustration in FIG. 1.

Its keyboard 21 may have, at the left, a separate key 23 for each digit and a key 24 for the decimal point. At the right side of the keyboard 21 are seven keys 25*a–g* that govern functions — namely, *a:* "plug," *b:* "minus," *e:* "multiply," *f:* "divide," *d:* "equals," *g:* "total" and a "clear" key 25*c*, so that one can clear off a previous result and start on a completely new problem.

Before going into the details of the invention, a short description of the operation of the calculator will be given as an aid to understanding the subsequent detailed material.

When adding, the basic operation is performed by (1) entering a first number one digit at a time, beginning with the leftmost digit, and (2) depressing the "plus" key 25*a*. If another number is to be entered, its digits are next keyed in successively and the "plus" key 25*a* is again depressed. After entry of the last number to be added, the "total" key 25*g* is depressed, and the result then appears on the display 22, in place of the last number entered. Though not visible to the operator, each digit entered will be stored internally in "excess three" binary-coded decimal form, five bits being provided in each order but the digit requiring only four of these and the fifth being available for decimal point storage or correction control during arithmetic processing, as will be seen.

For subtraction, after additive entry of the first number (minuend), the number (subtrahend) to be subtracted from the first one is entered, and the "minus" key 25*b* depressed. Mixed addition and subtraction can continue, with the "total" key 25*g* giving the result after entry of any series of numbers. As will be seen, this "total" sum may be used as a sub-total (by depressing the "plus" key 25*a* to re-enter the quantity displayed), and addition or subtraction can be continued by entering another number followed by the "plus" or "minus" key 25*a* (or *b*).

In multiplication, a first number (multiplicand) is entered, the "multiply" key 25*e* is depressed, a second number (multiplier) is then entered, and the "equals" key 25*d* is depressed to obtain the product. The operation for division is similar, with the first number (dividend) being entered, the "divide" key 25*f* depressed, the second number entered, and then the quotient obtained by depressing the "equals" key 25*d*.

The only key on the left side of keyboard 21 which can effect an entry in the fifth bit is the decimal point key 24, depression of which changes the fifth bit of the last-entered digit from a 0 to 1, if (and only if) that is the first time the decimal point key 24 has been depressed during entry of a number. If key 24 is not pressed at all, a decimal point will appear automatically at the extreme right of the last digit entered upon depression of a function key 25*a*, *b* or *d–g*, the clear key 25*c* removing the decimal point from the display 22 and showing only a zero in the least significant digit position of display 22. Thus, if one wishes to enter the number 326 and depresses serially the 3 key, the 2 key, and the 6 key and then presses a function key 25, whether "plus," "minus," "multiply," or "divide," the depression of the function key results (in a manner to be explained subsequently) in the appearance of a decimal point at the right of the 6 in the display (a "1" being entered in the fifth bit position adjacent the four bits of the code for the digit "6").

The decimal point is displayed at the right of the digit following which the "decimal" key 24 is depressed, although in the logic diagrams (which follow conventional practice), the fifth bit position occurs at the left of the bits of each digit. To repeat this point, the conventional diagram showing the bits reads from right to left with the fifth or "decimal point" bit at the left and the four data bits on the right. The display of the decimal point is nonetheless at the right of that digit having a "1" in its fifth bit storage position, and the arithmetical operations are carried on with the decimal point treated as being at the right of the digit after which it was entered.

Figures 2A, 2B:
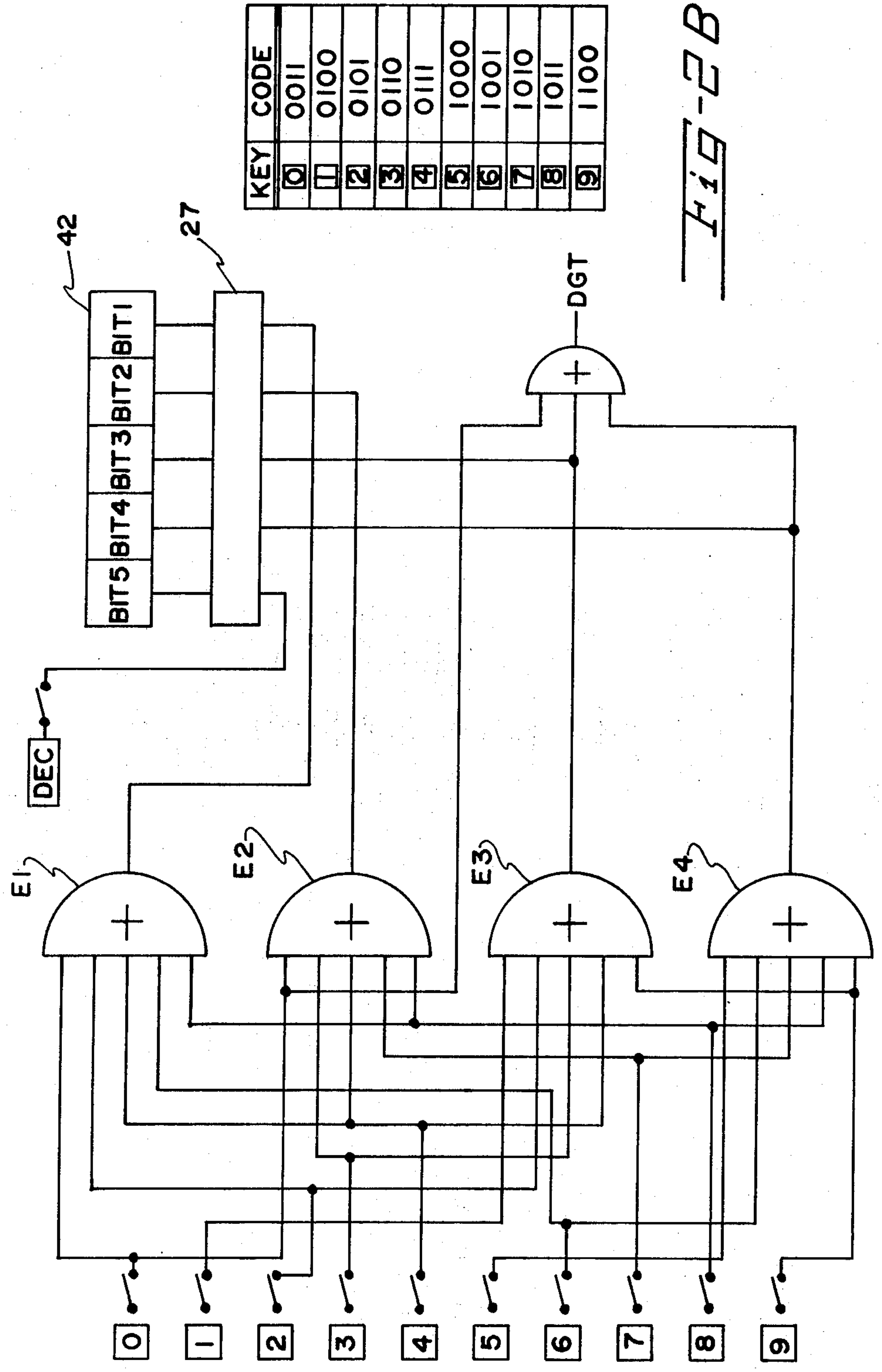
FIGS. 2A,B is an explanatory diagram of a five-bit digital system of this invention, with an excess-three binary coded digital circuit applied to the four bits of one digit and with the presence or absence of a decimal point applied to the fifth bit of that digit; this figure also shows the relation between each digit key and its corresponding binary code in the excess-three system.

The Excess-Three System Briefly Explained (FIGS. 2*A*,2*B*)

In the device, the "excess-three" system is used. The principles are well known (see, for instance, Chapter 6 of "Arithmetic Operations in Digital Computers," by R. K. Richards, D. Van Nostrand Co., Inc., 1955) and shown in FIGS. 2*A*, 2*B* where the logic used for entry and the code for each digit are both shown. Basically, each binary code is modified by addition of a binary three to it. Thus, instead of zero being represented by binary 0000, it is coded as binary 0011. In other words, depressing the "zero" key 23 on the keyboard 21, for ihstance, actuates both the E1 and E2 gates in FIG. 2*A* and enters what would ordinarily be called 3 in the binary system, but the machine will treat it as the proper entry for a zero, will display it as a zero, and will always correct to the excess-three code after any arithmetic operation. All of the digits of the decimal number are coded similary, FIG. 2B, each iwth a 3 added to it, so that the machine might be said to operate from 3 to 12, or from 0011 to 1100 for each of the four-bit digits, instead of operating from 0 to 9 or 0000 to 1001.

Since each digit is always entered with the excess-three, it is apparent that any sum of two digits will give rise to a falsely coded result and that any sum which would (as entered) produce 10 (or more), will in this excess-three binary system produce 16 (or more) and thus give a falsely coded result and a carry. Thus, instead of adding 8 and 4 to get 12, the machine is really adding 11 and 7 to get 18, with the carry going into the fifth bit, and the false result then being corrected according to the binary value in the fifth bit (as will be subsequently explained).

The Registers

The calculator in which the invention is embodied has four internal registers, as follows:

1. the K Register, or keyboard register, in which all entries are made and which is the only register with contents read out to the display 22;
2. the W Register, or working register, where the results of arithmetical operations are obtained;
3. the A Register, or accumulator register, which is used to store the results obtained in the W Register in addition and subtraction, so long as the A Register capacity is not exceeded; and
4. the F Register, or factor register, which is used in conjunction with the W Register and the K Register in multiplication and Division, and which stores the multiplicand and the divisor, respectively during these operations.

Each register is a dynamic shift register (static shift registers could also be used, obviously) and has a fixed number of digits, preferably the same number. By way of example, it will be assumed that each register has eight digits, though there may be more or fewer. Broadly speaking, Y1, Y2, Y3, ... Y8 herein respectively refer to the first ordinal digit, the second ordinal digit, the third ordinal digit, ... the eighth ordinal digit of a given register "Y," each digit having five bits, as previously mentioned, so Y1B1 means bit one of the first digit, and Y8B5 means bit 5 of the eighth digit of register "Y."

Figure 3A:
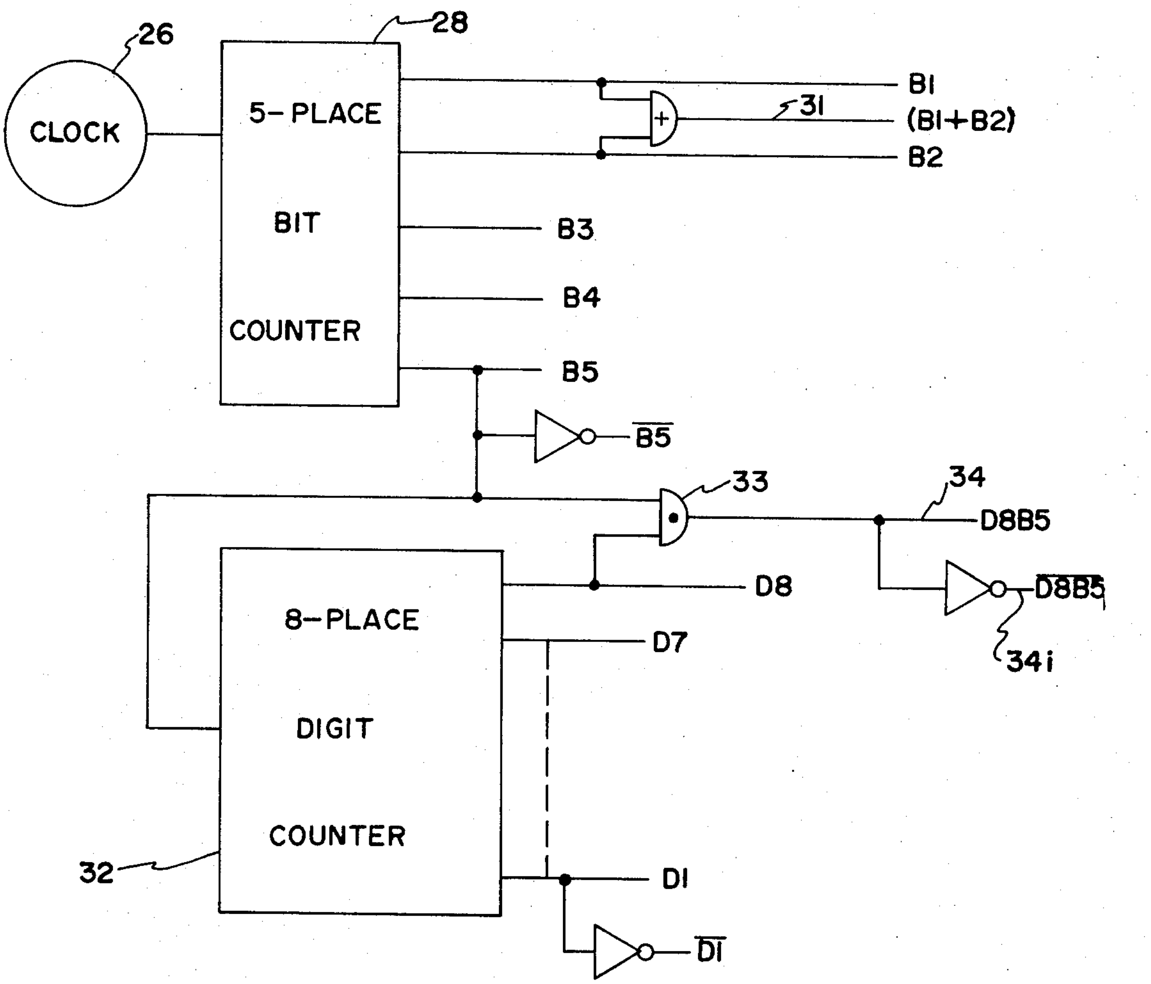
FIGS. 3A,B is a block diagram of timing signal generation for each bit of an eight digit system according to the invention, together with some particular signals used generally therein.

Timing (FIG. 3A)

In the embodiment of the invention, the appearance of each bit of each digit is timed to take place successively in a bit-serial, digit-serial number. Thus, first the bits for the first, least significant, digit are read out and re-entered in serial order, at times D1B1, D1B2, ... D1B5, and then the same bits for the next digit are read out and re-entered serially at times D2B1, D2B2, ... D2B5 and so on through all the digits to D8B5, eight digits being used in the embodiment — though there could be more or fewer. The digit and bit time signals are developed by appropriate gating of signals from corresponding counters 32 an 28, which are timed by a clock generator 26, as shown in FIG. 3A. At D8B5 time all entries for one cycle have been made, and a number of things happen at that time, as will be described.

Timing is important in the circuit, as in all electronic calculators, and there is one bit of delay at each bit of each digit, so that D1B5 corresponds to the fifth bit of delay after initiation of a memory cycle, i.e., just before D2B1, and D8B5 corresponds to the fortieth bit of delay. KNB1, KNB2, KNB3, KNB4, KNB5 represent specifically the five bits in the Nth K register digit, and so on. A bit of delay is indicated in the drawing by the Greek Letter: capital delta (Δ); so 5Δ means five bits of delay, and 35Δ means 35 bits of delay. The "bit delay" or delta may also be defined as unit clock time delay, the output of generator 26, and this can be obtained in various ways (a "two-phase" system in MOS technology, for example).

Figure 3B:
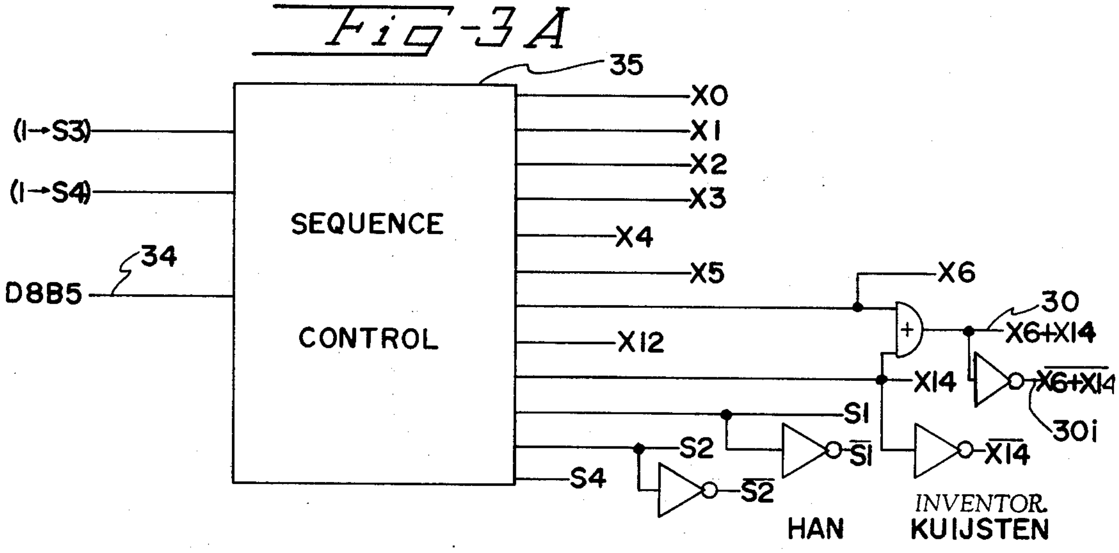

Description of Sequence Controls (FIG. 3B)

The desk calculator uses four flip-flops (not shown, but referred to as S1 ... S4 and being weighted according to the 1-2-4-8 code) to distinguish in known fashion the various conditions of operation. These four flip-flops are so interconnected as to identify sixteen possible states, but not all of these states are needed. The desk calculator performs its operations by means of routines which involve progression through a succession of states, each identified by a particular combination of settings of the four flip-flops and each transition to a new state involving a change in the setting of one or more of the flip-flops. The routines also include branches or loops and most routines share steps in a progression. Each routine is controlled by a signal initiated upon depression of one of the keys in keyboard 21 or upon turning on power to the calculator (unnumbered switch at upper right in FIG. 1).

Figure 4:
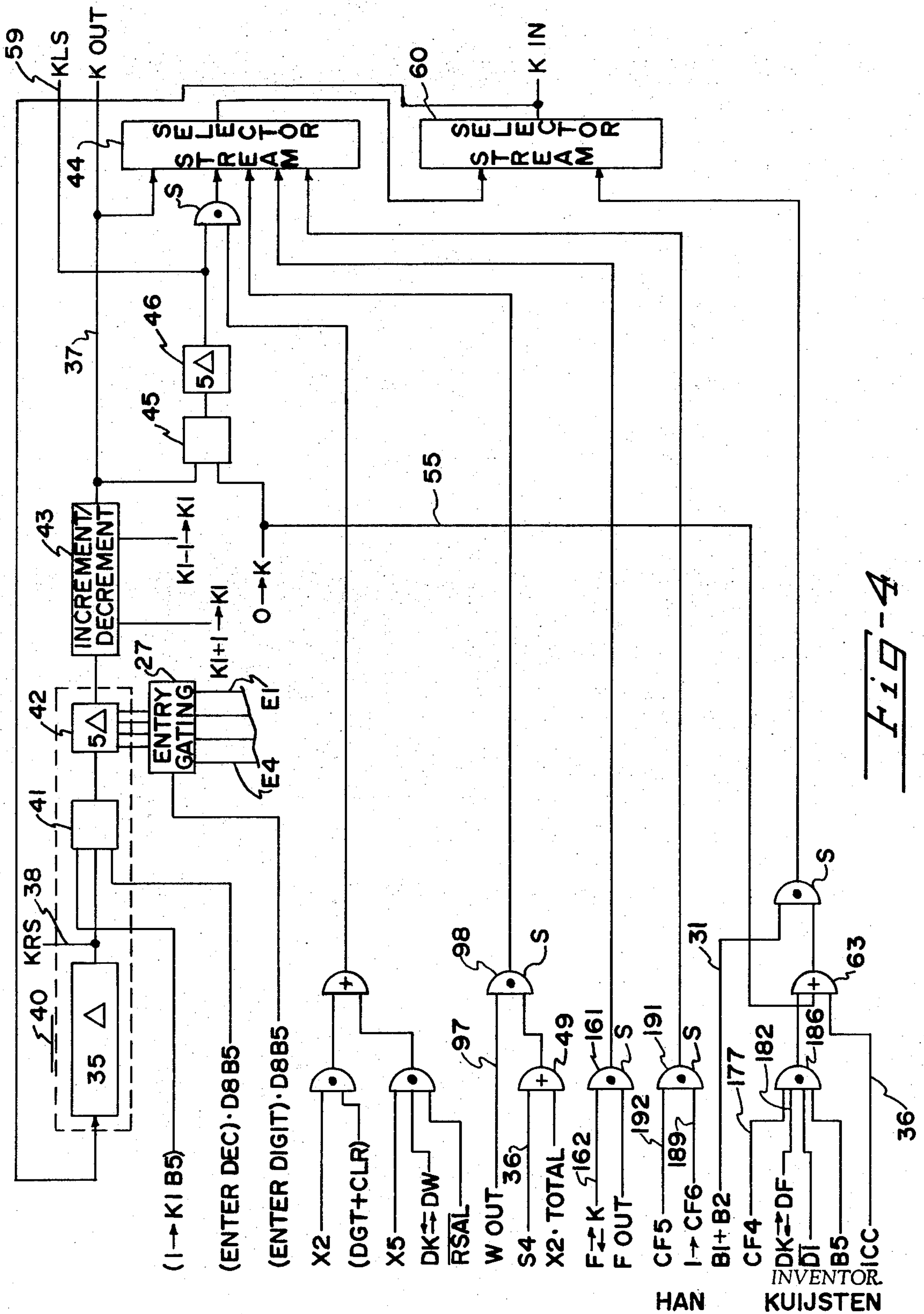
FIG. 4 is a simplified diagram of one register of the device, namely, the keyboard register, or entering register.
Figure 6:
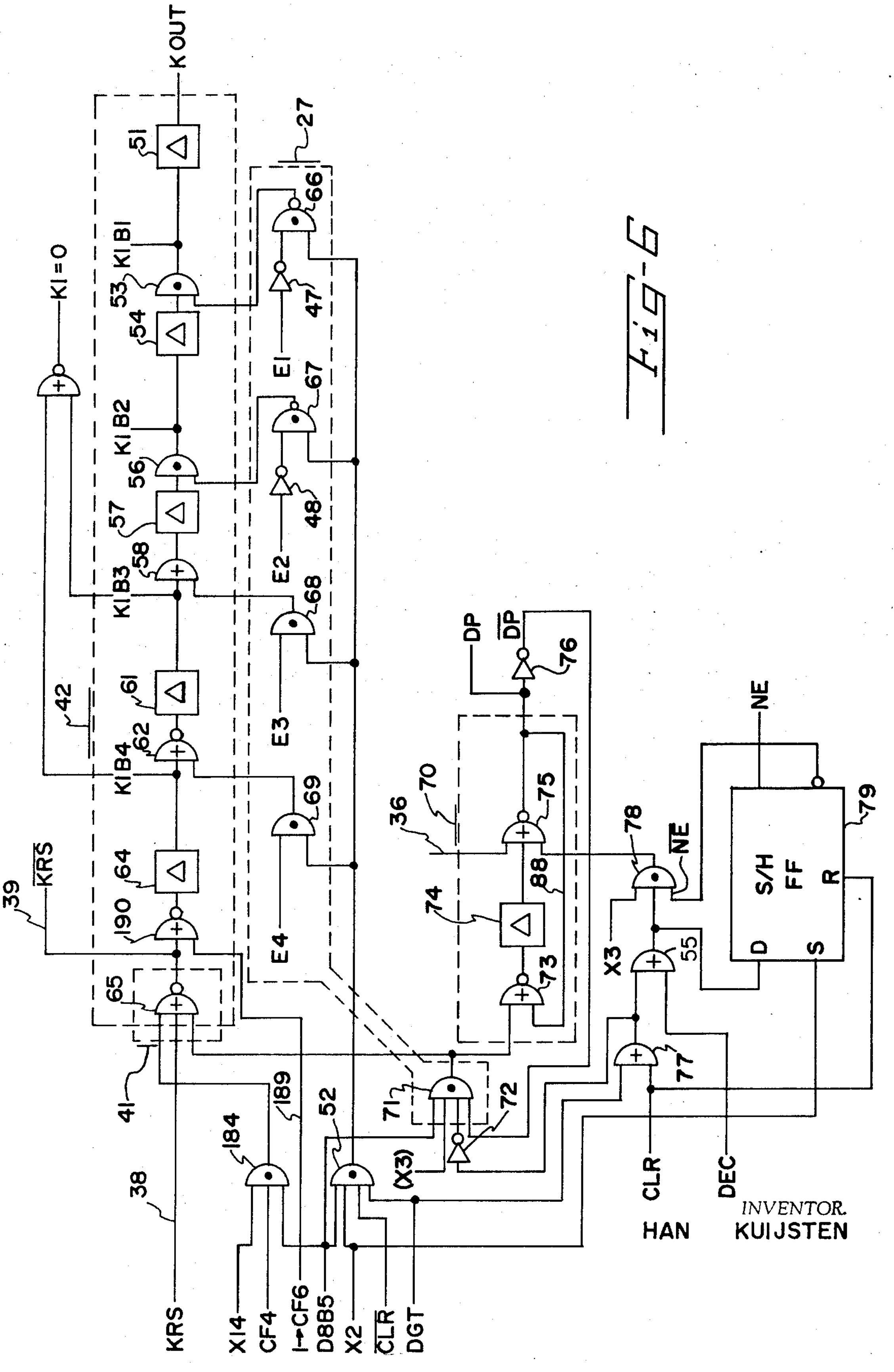
FIG. 6 is a generalized logic diagram of the entry of a digit or decimal point.

Entry of Digits (FIGS. 2, 4, and 6)

The entry of digits via keyboard 21, as shown broadly in FIGS. 2 and 4 and more specifically in FIG. 6, is always into the K register. Each digit of a number is immediately transferred into K Reg upon pressing a digit key 23. Thus, a number such as "326;" displayed as in FIG. 1, will be entered as read from left to right: first, entry of the digit 3, followed by entry of the digit 2, followed by the entry of the digit 6. The digit 3 will initially be stored in the first order or digit position (D1 time) of K Reg and will be coded there in the excess-three system, that is, it will appear as 0110. Upon entry of the digit 2, the digit 3 (0110) shifts to the second order (D2 time) of K Reg and the 2 (0101) appears at the first order or digit position (D1 time). Upon entry of the digit 6, the 3 (0110) is shifted to the third order of K Reg, the 2 (0101) shifts to the second order of K Reg, and the 6 appears in the first order of that register, coded as 1001. The decimal point will appear if the key 24 is depressed or automatically when a function key 25*a*, *b*, *d–g* is depressed (the "clear" key clears the display of any decimal point).

Before discussing the actual entry, consider the keyboard memory circulation, shown in FIG. 4. There, the series of data signals "K In" goes to the input of the K register 40, hereinafter referred to as K Reg, comprising an initial 35 bit dynamic shift register portion having an output tap KRS 38 for right shift of data emerging from the dynamic memory. This signal and the (Enter Digit) · D8B5 signal (described subsequently in connection with the details of digit entry) go to a gating element 41 and from there to a further five-bit dynamic shift register 42, comprising the remaining five bits of the forty needed for storage of eight five-bit digits. Register 42 is also tapped in parallel (FIG. 6) to give appropriate data signals such as K1B1, K1B2, etc. at D8B5 time for control purposes. The serial output data signals may pass through an increment/decrement circuit 43. Normally, there will be neither incrementation or decrementation and the resulting "K Out" signal goes directly to stream selectors 44,60 and thence to the input of shift register 40, K In. For left shift, K Out may also go (through a logic circuit 45 where "0" digits are also inserted when the left shift is accompanied by a clearance, such as in digit entry) to another five-bit dynamic shift register 46 (as will be explained later), and thence to the stream selector 44 (which has further inputs and control signals used in other routines). The other registers are substantially identical to K Reg in structure, but have different stream selectors and no means for direct digit entry via keyboard 21, of course.

Figure 5:
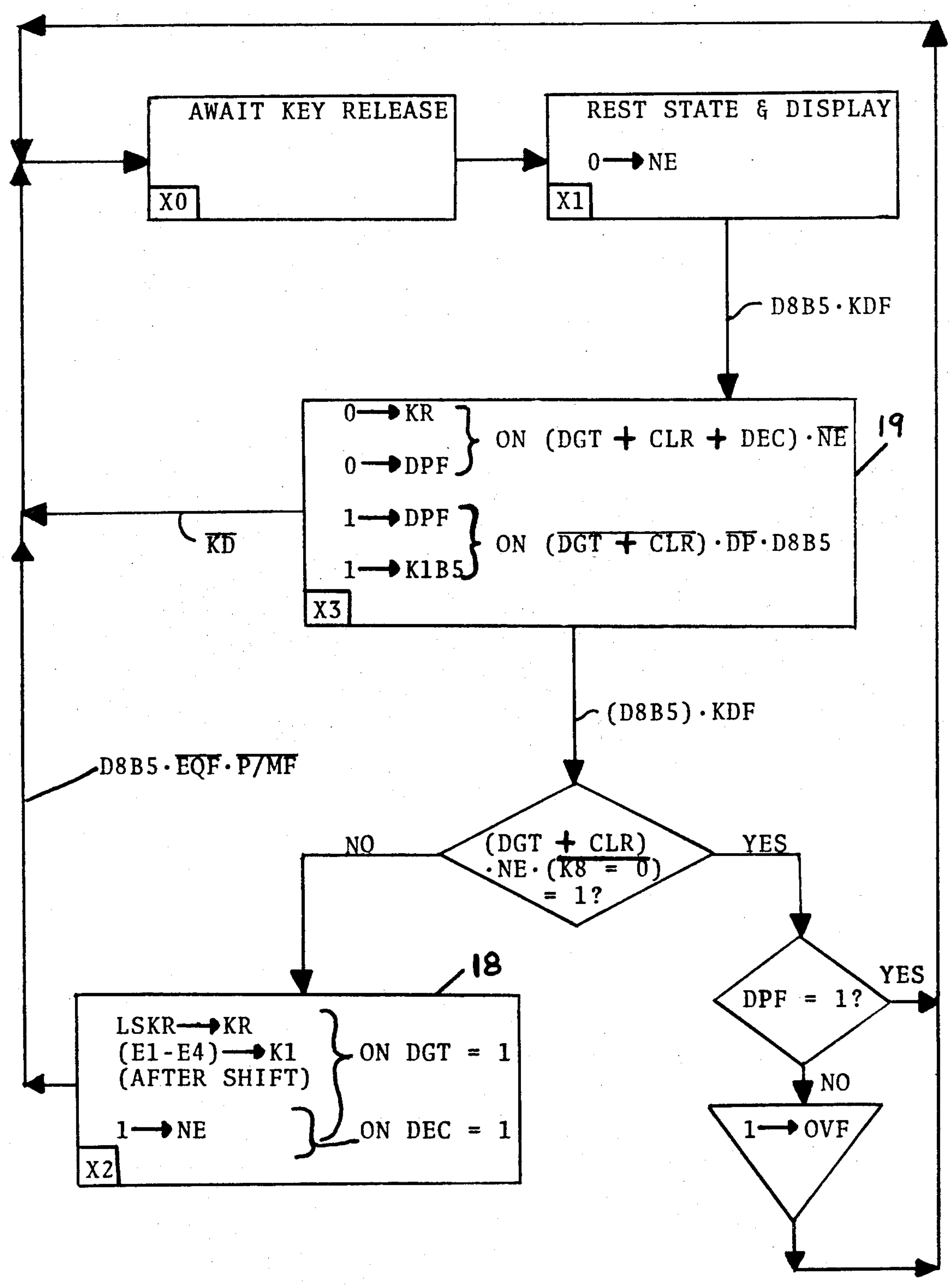
FIG. 5 is a flow diagram of the entry routine embodied in the present invention.

From the foregoing, it will be evident that information circulated in K Reg can be shifted left and, in particular, that if depression of a digit key 23 causes a left shift in a cycle prior to entry of the bits of that digit into the buffer register 42, then all previously entered digits will be to the left of the latest entry and the "zero" entered into the right-most digit position of K Reg will provide the necessary space for entry of this next digit, as expressed in the Entry Routine of FIG. 5. There it will be noticed from box 19, which corresponds to the state X3 of Sequence Controls 35 of FIG. 3B, that K Reg 40 and the decimal point flip-flop "DP" (70 in FIG. 4) are cleared (reset) in that state on depression of any digit key 23 (FIG. 1) or the decimal point key 24 corresponding to the first digit of a new number. Similarly, from box 19 of FIG. 5, corresponding to state X2, it is seen that in state X2 there is first a left-shift of K Reg contents (LSKR) and then entry of the code into the K1 position after the shift, if the key depressed was a digit key 23. A "New Entry" flip-flop NE (79 in FIG. 6), used to mark the fact that a digit forms part of a new entry, is also set in this state provided the key depressed was one of the digit keys 23 or the decimal point key 24. If one of the function keys 25*a–g* is depressed, flip-flop 79 will be reset in state X2, in preparation for detection of the first digit of the next number entered, which must be accompanied by a preclearance in state X3, as remarked above. The actual entry elements will now be discussed in greater detail with respect to FIG. 6.

Entry of a Digit (FIG. 6)

FIG. 6 is an expansion of the elements 27, 41, and 42 in FIG. 4. Five points of entry are shown, one for each bit of the digit and one for the decimal point, together with six outputs (used also for control purposes) are shown for reference — namely, K Out, K1B1, K1B2, K1B3, K1B4, and KRS (or its invert). Between K1B1 and K Out, there is a unit clock time delay 51 (or bit of delay). Between K1B1 and K1B2 are an AND gate 53 and a bit of delay 54. Between K1B2 and K1B3 are an AND gate 56, a bit of delay 57, and an OR gate 58. Betweek K1B3 and K1B4 are a bit of delay 61, and an OR gate 62. Preceding K1B4 are a bit of delay 64, a NOR gate 190 and a NOR gate 65.

It will be recalled that K1B3 and K1B4 are normally zeros when K Reg is clear, as it is during entry, so the respective AND gates 68 and 69 for entering the E3 and E4 bits of the code for the digit key depressed are enabled upon "Enter Digit" at D8B5 time to send the proper signal to a respective OR gate 58 or 62, if the corresponding bit of the new digit is a 1. The "Enter Digit" signal is provided upon depression of any key 23 by means of the "Digit" OR gate 17 (FIG. 2A) which then gives an output supplied to a four-input AND gate 52 (FIG. 6) having the state X2, a "Not Clearance" signal ($\overline{CLR}$) and the D8B5 signal for timing, in known fashion. D8B5 is provided by the eight-stage digit counter 32, FIG. 3A, which advances from one stage to another at the end of each fifth bit, together with an AND gate 33 having the eighth stage and B5 as inputs.

It will also be recalled that there will be "1's" in K1B1 and K1B2 when K Reg is clear, hence these must be passed along unless the code for the digit being entered has a "0" in these bit positions. Accordingly, the AND gate 53 receives its input from the bit delay 54 and from a NAND gate 66 which has a "true" output except when E1 is zero (i.e., $\overline{E1} = 1$) combined with presence of the signal (ENTER DIGIT) · D8B5 on line 50. In the latter case, AND gate 53 will be closed and will not pass a 1 bit. Similarly, on "Enter Digit" and D8B5, when E2 is zero, a blocking input is fed to AND gate 56 through a NAND gate 67. The need for inversion of the E1 and E2 signals explains the presence of the inverters 47 and 48 between E2 and E1 and their respective NAND gates 67 and 66. It might appear that the second and third bits are entered at almost the same point, but the significant thing to be noted here is the presence of the bit of delay 57 between the points of entry.

The decimal point entry is somewhat more complex. It incorpoates a decimal point flip-flop 70, the purpose of which is to make sure that only one decimal point is entered per number. Once a decimal point has been entered, no other decimal point can be or will be entered, either manually or automatically, relative to any other digit of the number. As stated previously, if no decimal point is entered at all, there will be an automatic entry at the right-most digit upon depression of a function key, but this must be suppressed if manual entry has already occurred. As part of the decimal point entry system, an AND gate 71 is fed by four signals, the first of which is the D8B5 signal, the second of which may be called "First Active State" (state X3 in FIG. 5, to be explained later), this being a circuit that is activated by the depression of any key including a digit key 23 and remains activated (i.e., in the "1" state) for one cycle such that preclearance, if needed, can be completed. The next element feeding AND gate 71 is an OR gate 77 to which are fed two circuits, one activated by depression of any digit key 23 and the other by depression of the "Clear" key 25*c*. In order for AND gate 71 to pass a signal, this OR gate 77 must give a signal, which indicates — after passage through an inverter 72 — that neither a digit key nor a clear key was depressed. Finally, the fourth input to AND gate 71, $\overline{DP}$, is an enabling signal obtained by inversion of the output of decimal point flip-flop 70, described below, the purpose of which is to permit entry of a fifth bit only in one digit position during entry of the related numbers.

When a signal passes through AND gate 71 it goes to the decimal point entry at a NOR gate 65, and also goes to the decimal point flip-flop 70, a dynamic flip-flop. Flip-flop 70 comprises a two-input NOR gate 73 which receives the output of AND gate 71 along with a feedback signal which is to be recirculated in dynamic flip-flop 70. Following NOR gate 73 is a bit of delay 74 and another NOR gate 75, output of this last going to a feedback line 88 (connected to NOR gate 73, as mentioned above) and to an inverter 76, which supplies the signal $\overline{DP}$ back to AND gate 71. During entry of any number, this decimal point flip-flop is maintained in its given state by recycling of the output on line 88. The second NOR gate 75 is fed not only by the delayed output from the first NOR gate 73 of flip-flop 70, by also by an "Initial Clearance" signal (line 36) which operates in known fashion to clear all registers and reset all flip-flops as soon as the machine is turned on, and by another circuit described next.

As mentioned in connection with FIG. 5, a preclearance of K Reg 40 is required upon the first depression of a digit key 23 (or decimal point key 24) after depression of a function key 25*a*, *b*, or *d*–*g*. Such depression of a digit key 23 signals that a new number is being entered and not only that the previous factor or result must first be cleared, but also that the decimal point flip-flop 70 must be reset. This is accomplished through the other circuit connected to gate 75, which circuit includes OR gates 77 (previously described) and 55, fed by depression of any digit key 23 or "Clear" key 25*c* or decimal point key 24. These OR gates supply an AND gate 78, the output of which effects the desired clearance of K Reg 40 and resetting of flip-flop 70. In order to be activated, gate 78 requires a "true" signal from the first active state, X3, mentioned before, and from the inverted output side of a "New Entry" flip-flop 79. This flip-flop is of the "Sample and Hold" type and its purpose is to prevent more than one preclearance of K Reg 40 during entry of a number. Subsequent depression of keys 23 (or 24, if not depressed initially) for the second and further digit entries must not be accompanied by a clearance of K Reg, obviously, so this is prevented in known fashion by setting flip-flop 79 upon entry of the first digit of the number and resetting it upon depression of a function key 25*a*, *b*, or *d*–*g*, preclearance being performed in state X3 and being permitted only when flip-flop 79 is in reset condition and a key 23,24 is depressed, as shown by the inptus to AND gate 78.

Returning to consideration of flip-flops 70 and 79, it should be noted that there are some points which need explanation with respect to setting of the former and resetting of the latter. Flip-flop 70 is set, according to the previous description, upon depression of the decimal key 24 or automatically upon depression of a function key 25*a*, *b*, or *d*–*g*, yet only one AND gate 71 is shown as sufficient for the purpose. The reason for this is that the inverted output of OR gate 77 is true whenever the state X3 is associated with a routine initiated by depression of a key other than a digit key 23 or a clear key 25*c*, i.e., it is true on depression of a function key 25*a*,*b*,*d*–*g* or the decimal point key 24. As to flip-flop 79, it will be noted that the signal for resetting the flip-flop is generated by depression of the clear key 25*c*, yet setting occurs on a signal through OR gate 55 coming from OR gate 77 which gives an output whenever clear key 25*c* is pressed. This causes no problems because the reset input dominates, as can be seen by looking at the structure of flip-flop 70, which is also a dynamic flip-flop although having a different mode of operation ("Set-Rest," rather than "Sample and Hold").

Figure 7:
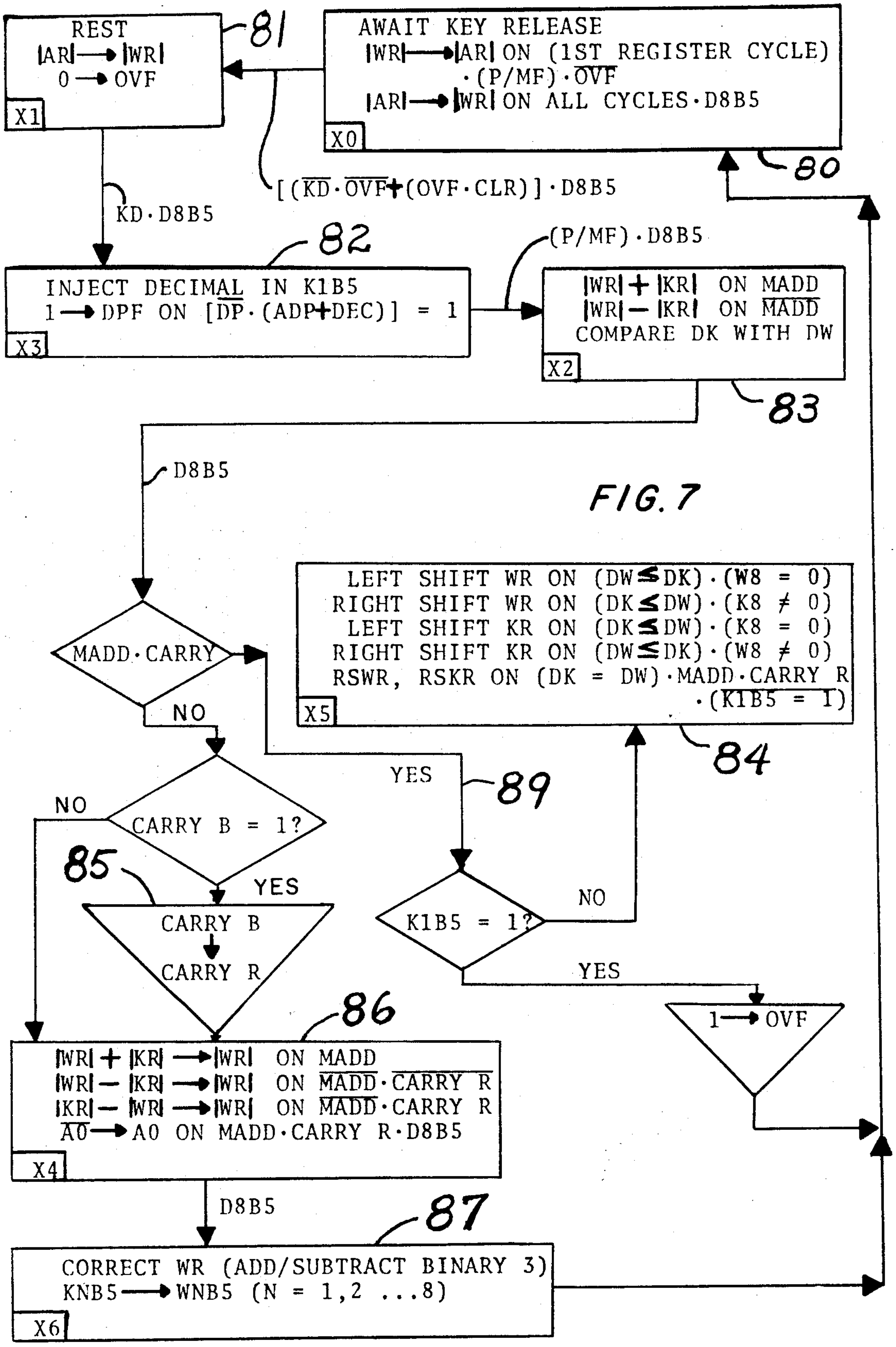
FIG. 7 is a flow diagram of the addition-subtraction routine embodied in the present invention.

The Addition and Subtraction Routines (FIG. 7)

Before beginning the discussion of the routines, brief consideration of further elements involved may be helpful.

In the operations of addition and subtraction the invention employs three of the four registers previously mentioned, namely: the keyboard register, K Reg, the working register W Reg, and the accumulator register, A Reg, this last merely storing the results of additions or subtractions. The W Reg is substantially identical to K Reg in structure and is the register in which sums or differences are temporarily stored, as will be seen.

A "W right shift" output, WRS, obtained on line 98 (FIG. 8) from a 35-bit delay shift register forming the main part of W Reg 96, passes through a five-bit shift register 90 to give the normal output, W Out on line 97. This last then goes alternatively either directly to a stream selector 93 or through a further five-bit shift register 92 for a left shift, if that should be needed. Clearly, if shift register 90 is by-passed in the circulation, there will be a shift of the contents to the right by one position in each machine cycle (eight digits in the embodiment described). Similarly, if register 92 is included in the circulation, there will be a shift of the contents to the left by one position in each machine cycle. The position vacated by the shift in either direction has a zero inserted in it through appropriate gating in known fashion. Stream selector 93 has applied to it other data and control signals, in addition to "W Out." These include the "A Out" signal on lien 93*a* and signals on lines 93*b,c* from several unnumbered AND gates which air actually part of stream selector 93. To one AND gate is applied a signal $(X_4+X_6)$ and a signal from another stream selector 95, these relate to addition/subtraction and will be dealt with shortly. The output of stream selector 93 goes to a further stream selector 94, the output of the latter being the "W In" data line connected to the input of W Reg 96. Stream selector 94 chooses between the output of selector 93 or a special input "0 → W" on line 101. Thus it is evident that the W In signal from stream selector 94 omes selectively from a number of sources, goes to the 35 bits of delay in W Reg 96, and produces the above-mentioned WRS signal that is normally passed through the five-bit delay 90, delay 90 thus comprising part of the complete W register 96, insofar as normal circulation is concerned.

Figure 8:
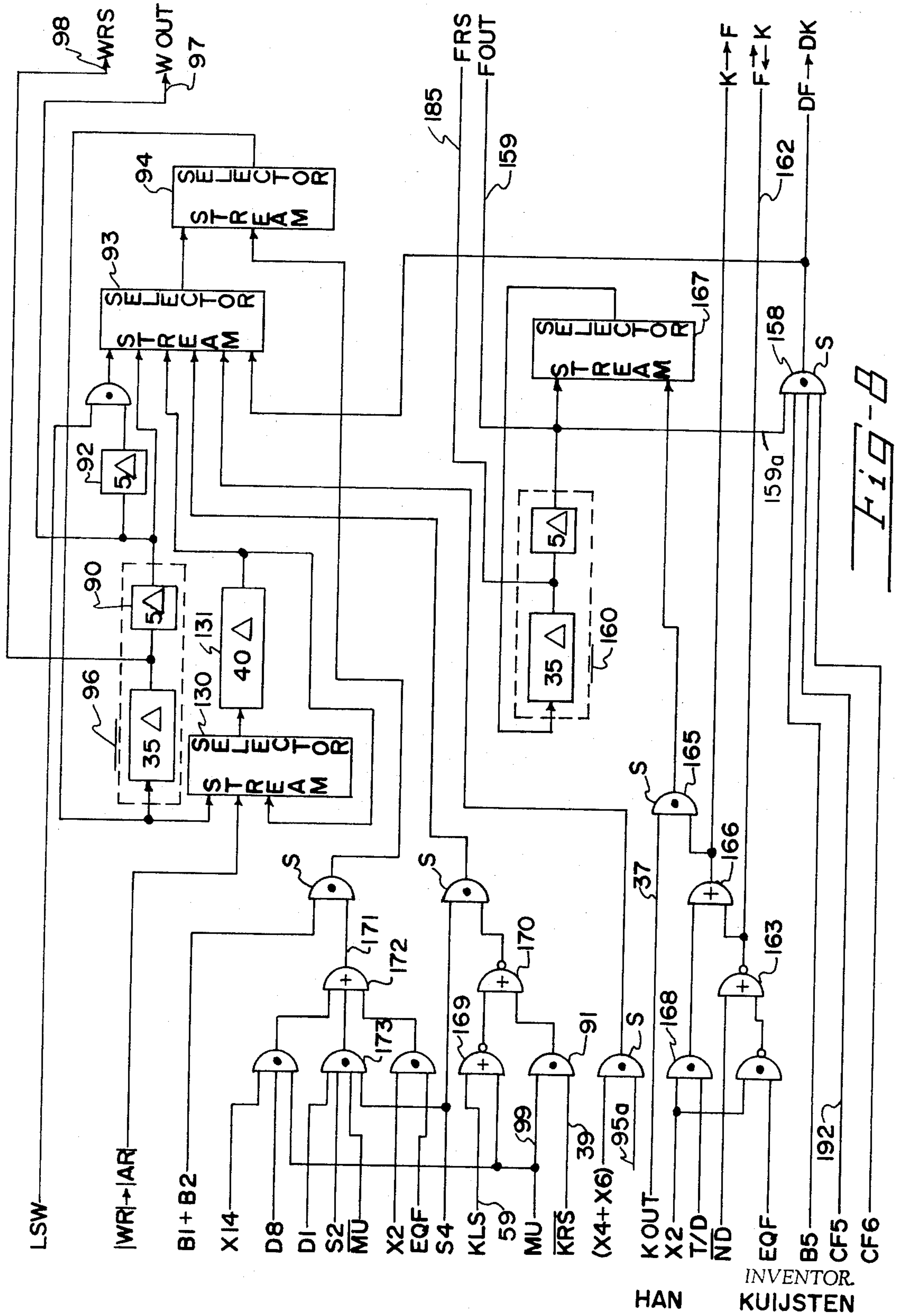
FIG. 8 is a logic diagram of the other three registers of the calculator and related control elements.

The A Reg 131 is much simpler than either K Reg 40 or W Reg 96, as it has no provisions for either left or right shifting. The input to A Reg 131 appearing in FIG. 8 shows a stream selector 130 with a W In signal under control of a signal "Transfer from W Reg to A Reg" as one input and also a feedback of the "A Out" signal as the input for normal circulation. The stream selector 130 feeds to 40 bits of delay, output of which is termed the A Out signal. This last signal is not only fed back to stream selector 130 for normal circulation, but also goes to the stream selector 93 of W Reg, to which we have previously referred. Stream selector 93 operates to transfer the contents of A Reg to W Reg during the rest state X1, so that both store the same information at all times except during the computation routines. This simplifies the structure because circuitry for transferring from W Reg to K Reg (the sole register connected to display means) already exists for other reasons (shifting in multiplication), hence special gating for control of transfer from A Reg to K Reg during a "Total" operation is obviated.

The addition-subtraction sequence can be seen from FIG. 7, a flow diagram. From the rest state X1, the machine goes to state X3 (box 82) at the next occurrence of D8B5 time on depression of any key, 23, 24, or 25*a–g*. There a decimal point will be injected at the K1B5 location, if the decimal point key 24 was the key depressed or if the key depressed was a function key 25*a, b,* or *d–g*. If there had already been a decimal point injection in the same number or if the latest key to be pressed was a digit key 23, the machine returns to state X0 to await key relase, and returns from there to state X1 when the key is released. If the latest key to be pressed is a "plus" key 25*a* or a "minus" key 25*b*, then once the decimal entry has been taken care of, (meaning, either that a new decimal point is injected at the far right, or that the machine has found that a decimal point had already been injected in that number previously by decimal point key depression) the machine goes to state X2 at box 83.

In this routine (addition-subtraction), the state X2 first causes a trial arithmetic operation, a magnitude addition (or subtraction) for detection of potential overflows or overdrafts, as discussed subsequently. The trial is performed while also determining whether the figures to be added or subtracted have been placed in alignment or are already aligned, that is, if the decimal point is in the same location in both figures. As shown in FIG. 7, it is first necessary for the decimal points of each pair of numbers to be pre-aligned before the actual arithmetic operation. The pre-alignment is accomplished in a way giving the greatest degree of accuracy. The rule followed by this machine is (1) find out whether any shift is necessary, i.e., "is DK = DW?"; (2) if a shift is necessary, shift the smaller number to the left unless doing so would lose a significant digit, that is, if there is a digit other than zero in the left-most digital position so that a shift would push it out of the machine; and (3) if it is necessary to shift and a left shift would lose a significant digit of the number that would oridinarily be shifted left, then shift the other number to the right.

If, however, the decimal points are not aligned, then the calculator goes to the X5 state, box 84. At that point, if the decimal point in W Reg is to the right of the decimal point in K Reg, W Reg is shifted one place to the left if the W8 digit is a zero. Whereas, K Reg is shifted one place to the right if W8 is not zero. On the other hand, if K Reg has its decimal point located to the right of that in W Reg, K Reg is shifted to the left. Whereas, W Reg is shifted to the right if K8 is not zero.

In other words, this logic automatically assures that the least significant digit is dropped, not the most significant digit, as would be true if alignment always employed a left shift.

There is, of course, the possibility that in both registers the 8th positions (K8 and W8) are occupied after alignment. If this is true, then as shown by line 89 if the sum developed in a trial addition during X2 results in a "carry" beyond W8, there is no digit position in which the "1" could be stored; so when such a carry is detected the routine goes back to the shifting box 84 and both numbers are shifted one place to the right, unless K1B5 = 1, i.e., the decimal point in K Reg 40 is in the least significant digit position. In such case, the flip-flop OVF is set and the machine goes back to state X0. It is a purpose of the trial addition to detect the overflow and cause the above-described right shift before the actual addition is performed (in state X4, as described subsequently).

As mentioned earlier, an arithmetic operation is performed in each cycle of X2. Whether the operation is a magnitude addition or magnitude subtraction is dependent upon the signs of the register contents to be accumulated, and the nature of the key depressed. If a minus key 25*b* has been depressed, a "minus" flip-flop (not shown, but conventional) will be set to give a signal "MNF." If further, the sign of A Reg and that of K Reg, stored respectively in flip-flops A0 and K0 (again not shown, but conventional) are unequal, it will be clear that the internal operation should be an addition, and vice versa. Accordingly, the signal controlling a magnitude addition is defined as:

$$MADD = (A0 = Ko)\overline{MNF} + (A0 \neq Ko)MNF$$

The signal for a subtraction will be the inverse of that, namely, $\overline{MADD}$. Accordingly, as shown in box 83, during state X2 the magnitude of the number in W Reg is added to the magnitude of the number in K Reg, if the signal MADD is present, i.e., when a "plus" key 25*a* has been depressed and the signs of the numbers are the same or when the "minus" key 25*b* has been depressed and the signs of the numbers are different, as is known. On the other hand, if the converse of the sign conditions is true in either of the above cases, the magnitude of the number in K Reg is subtracted ($\overline{MADD}$) from the magnitude of the number in W Reg, or vice versa, depending on which is larger. In this state, although at least a trial magnitude addition is performed, it has no meaning if the two numbers are not in alignment. Absence of such alignment is detected by comparison of the positions of the two decimal points, the decimal point in K Reg and the decimal point in W Reg.

The trial arithmetic operation has another purpose beyond the one mentioned previously, namely, detection of the case where the content of K Reg is larger than the content of W Reg in subtraction. In such case, there will be an overdraft during the trial operation. As a result, when the routine proceeds to the next state, where all actual additions and subtractions are performed, the machine will cause the content of W Reg to be subtracted from K Reg, as called for by the flow chart of FIG. 7, box 86. Referring again to FIG. 7, it will be noted that an interbit carry is stored in a flip-flop termed Carry B, and at D8B5 time the information in Carry B is placed in a flip-flop called Carry R, as indicated in the inverted triangle 85, which flip-flop remains in that condition for one machine cycle to produce the effect just described.

The numbers are actually added in state X4, as shown in box 86, that is, the magntidue of the number in W Reg is added to the magnitude of the number in K Reg on magnitude addition operation (MADD).

From this state X4, the machine goes to state X6 at box 87, the "correct W Reg" state in which first 0011 is added to (or subtracted from) each digit depending on whether that W digit's B5 is a 1 (or a 0), and then the decimal point from K Reg is copied into the W Reg, and finally on D8B5, the apparatus goes back to the X0 state.

All routines return to X1, the rest state, through a "holding" state, X0 (shown in box 80 of FIG. 7), that of awaiting key release, for no action can take place after completion of a routine until release of the key which initiated that routine.

Anything causing a return to the X0 state, which must be occupied for at least one cycle, causes the awaiting of key release before ending that state. Further, two important functions are performed in regard to the registers after an add/subtact routine. The first function performed is that whatever number is in W Reg is shifted into A Reg during the first register cycle in X0. In other words, depression of a plus or minus key 25*a* or *b* first operates to generate the sum or difference of the contents of W Reg and K Reg, the result being stored in W Reg, and then operates to transfer W Reg number into A Reg. There is one exception to this: if the overflow flip-flop OVF (not numbered, but indicates an "alarm" condition signalled by an indicator light 15 shown in FIG. 1 above key 25*c*) shows that such has indeed occurred, the transfer will not take place, as shown by the second equation in the X0 box 80 in FIG. 7.

The second function performed in the X0 state is that on all cycles at D8B5 time A Reg is copied into W Reg, i.e., transferred without clearing A Reg. Further, upon occurrence of an entry that would result in an overflow upon accumulation, the transfer from W Reg to A Reg does not take place (since the overflow flip-flop OVF is set as mentioned above), W Reg is cleared, and then copies A Reg and so W Reg has again the number that was in it before the attempt at an accumulation which would have resulted in an overflow. When the key is released, the machine goes to its rest state, the X1 state (box 81), on the next occurrence of D8B5 time and remains in that state until another depression of one of the keys of keyboard 21.

Example of an Addition According to the Invention

Suppose that the number 99.4 is to be added to 99.3:

099.3 +
099.4 +
198.7

The addition will be performed as follows in the excess-three system according to the invention:

| TIME: | D4 | D3 | D2 | D1 |
|---|---|---|---|---|
| W before | 00011 | 01100 | 11100 | 00110 |
| K Reg | 00011 | 01100 | 11100 | 00111 |
| W after | 00111 | 11001 | 11000 | 01101 |
| Correction | −00011 | +00011 | +00011 | −00011 |
| W Corrected | 00100 | 11100 | 11011 | 01010 |
| Copy decimal from K | 0 | 0 | 1 | 0 |
| W Reg to A Reg (sum) | 00100 | 01100 | 11011 | 01010 |

The number 99.3 present in W Reg as "W before" was originally entered in K Reg, added to W Reg on depressing the "plus" key 25*a*, and the results transferred from there to A Reg and copied from there again into W Reg. On entry in K Reg, the number 99.3 was coded in the excess-three system so that it is present in W Reg in that form. The number 99.4 is next entered in the K Reg, also coded in the excess-three system. Upon depressing the "plus" key 25*a* again, there is an addition of "K Reg" to "W before," the fifth (decimal) bit of K does not take part, as is usual, but that of W is lost at this stage as denoted by the dotted lines around the 1 in D2B5, because any carry resulting from the addition is stored there.

The result of addition expressed in "W after" represents false codes (not excess-three) and further shows what might be thought of as a double carry. In other words, a sum which results in a 1 in any of the fifth bits, automatically results in adding 1 into the first bit space of the succeeding digit. Thus, the presence of the 1 in W Reg at D2B5 time of "W after" causes addition of 1 to W Reg at D3B1, and the presence of the 1 at D3B5 causes a 1 to appear in W Reg at D4B1. Instead of disappearing after causing carry propagations, these 1's remain in their respective fifth bit positions, because they are also used to perform the next important function of correcting the false sum appearing in the "W after" row.

The rule of correction for addition, which can be easily verified by mathematics, is that if there is a zero in the fifth bit of "W after" for any digit, 0011 is subtracted from that digit and if there is a 1 in that fifth bit, 0011 is added to that particular digit, as shown in "W correction." Thus, in the example, there is a zero in the fifth bit of the first digit of "W after" so 0011 is subtracted from that digit to give the figure in "W Reg to A Reg." There is a 1 in each of the fifth bits of the second and third digits of "W after;" and, accordingly, to each of those digits 0011 is added. There is a zero in the fourth digit, and so 0011 is subtracted from it.

At this point then, so far as the four right-hand bits B1 to B4 are concerned, the contents of W Reg are ready for transfer to A Reg, but the fifth bits do not represent the decimal point. One further correction is therefore made, and this is to copy the decimal point into W Reg from K Reg before transferring W Reg to A Reg. This is accomplished by transferring the fifth bit of each digit of K Reg into the corresponding fifth bit of W Reg. For example, it makes not difference whether the fifth bit of a digit appearing in "W corrected" is a 1 or a 0, the decimal point in a given order of K Reg causes a 1 to be recorded in the fifth bit of the corresponding order, all other fifth bits being recorded as zeros because, as has been described broadly, there is means to prevent entry of more than one decimal point in K Reg. After return of the decimal point, W Reg is transferred into A Reg.

If there are to be further additions or subtractions, they can then take place because the number transferred into A Reg is also copied back into W Reg (and is the new accumulation so long as the overflow light 15 is not active). Thus, additions and subtractions can continue, and there may be either at any stage.

Whenever the "total" key 25*g* is pressed, the number in A Reg is transferred to K Reg and displayed, and at the same time cleared from A Reg (for a sub-total the amount must be returned by next depressing the "plus" key 25*a*). The total displayed is lost if the "Total" key 25*g* is pressed twice in succession or the "clear" key 25 (or a digit key 23) is pressed after the "Total" key. In any event, whenever the "Total" key 25*g* is first pressed, as previously discussed, the operation continues by transfer, for simplicity, not from A Reg, but from W Reg (identical to the A Reg) to K Reg, where the cumulative sum is displayed.

It should be noted that entry of another number into K Reg leaves the contents of W Reg unaffected until another step of accumulation takes place, i.e., when entry is followed by depression of a "plus" or "minus" key.

To summarize: Every number entered is recorded in K Reg in excess-three binary code. Pressing of a plus key results in adding the contents of K Reg to whatever is in W Reg; after which the result in W Reg is, however, incorrect in that the codes are false, not agreeing with excess-three code for the true sum. The addition is therefore corrected to keep the result in exess-three code, then transferred to A Reg and finally copied back from A Reg into W Reg again. Also, the decimal point, dropped from W Reg to allow for the correction during addition, is re-inserted from K Reg — originally aligned with W Reg. Totaling then transfers the sum from A Reg (actually from W Reg which contains the identical information) into K Reg and displays it.

Figure 9:
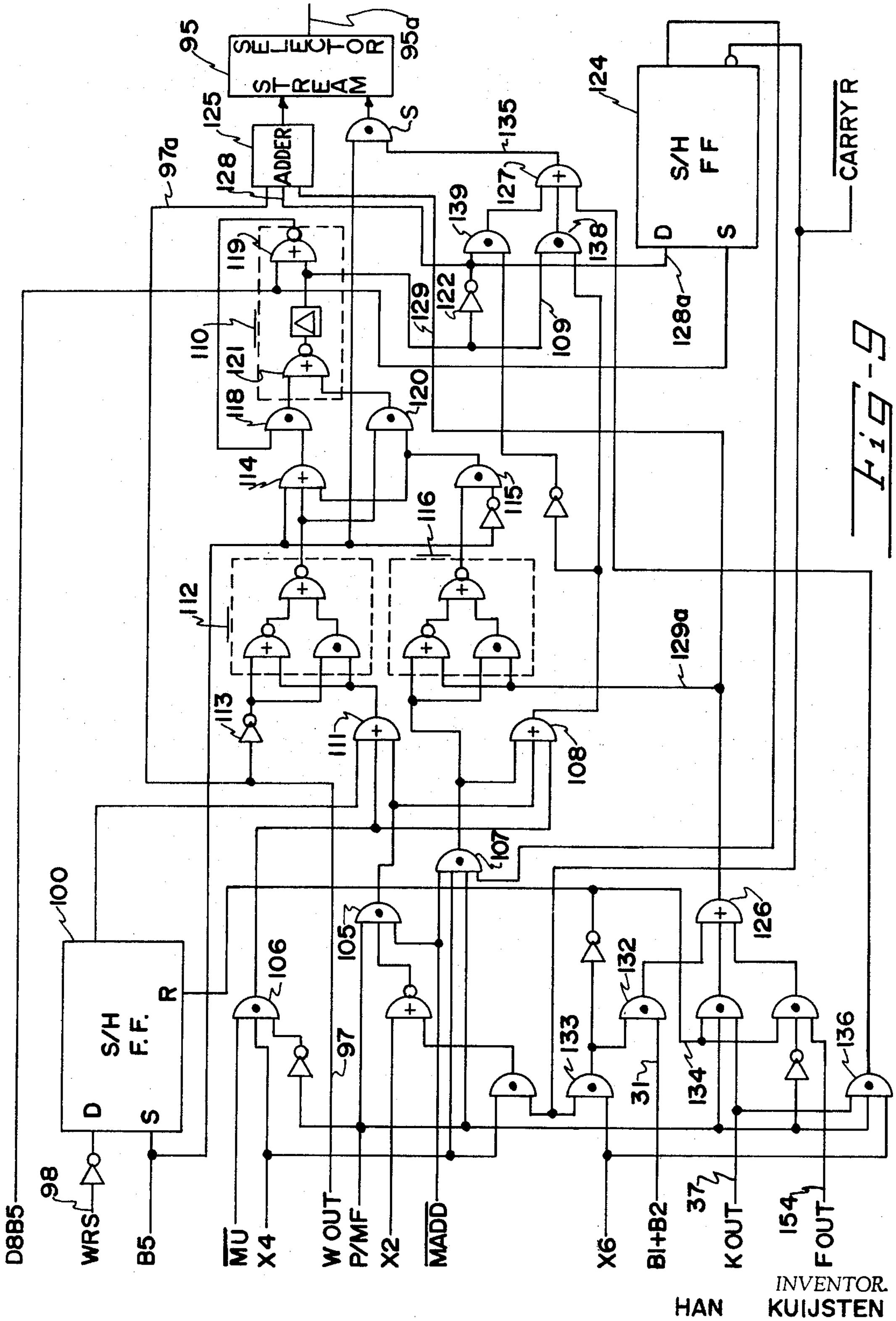
FIG. 9 is a logic diagram of the control elements employed in arithmetic operations according to the present invention.

The Operation of Addition (FIGS. 8 and 9)

The basic part of the action of addition has already been described with respect to the flow chart of FIG. 7. Several important sectors of the logic for its implementation will now be examined successively.

The Adder

The adder 125 accepts three inputs — A and B for data and C for carries (or borrows) — and in effect comprises two "Exclusive OR" gates in sequence (not shown, but known). Input A on line 97*a* is fed the W Out signal, that is, output 97 of W Reg (the output of the 40 bits of delay 96). The B input is a line 129 coming from an OR gate 126, and is either the K Out or the F Out signal (that is, one or the other of the outputs of K Reg or F Reg, respectively) or the (B1 + B2) signal on line 31 during correction. Input C on line 128 is the output from an interbit carry flip-flop 110, termed "Carry B."

It should be noted that the combination of the A and B inputs gives the same output in addition or subtraction and that the only difference between these two arithmetic processes relates to the differences of the carry/borrow logic. Thus, any subtraction, including the correction by minus 3 after an addition in excess-three code, only affects the carry/borrow circuits, as will be seen.

The OR gate 126 passes signals whenever any one of three conditions is fulfilled. The first condition is the presence of a signal at the output of an AND gate 132 having as its two inputs a "Correct" signal and the (B1 + B2) time signals on line 31. The "Correct" signal is the output of AND gate 133 having X6 and $\overline{\text{Carry R}}$ as its inputs (Carry R being described later). The second condition is the inverted output 134 of AND gate 133, either a plus key 25*a* or minus key 25*b* having been depressed, and K Out 37. The third signal (used only in multiplication and division, as described later) is the inverted output 134 of AND gate 133, neither a plus nor a minus key 25*a*, *b* having been depressed, and F Out 159.

Correction

As already noted, a binary-coded decimal system requires that there be a correction in certain instances, the excess-three system in particular requiring correction each time a sum or difference is obtained. With the excess-three code, depending on whether there is a carry or not, as indicated by the fifth bit during the correction cycle, there must be either an addition of 0011, if there is a 1 at B5 time, or a subtraction of 0011, if there is a zero at B5 time, as previously described for addition in that code (correction during subtraction will be discussed subsequently). This is achieved with the aid of a "Minus 3 correction" flip-flop 100 shown at the left of FIG. 9. The nature of the correction is controlled by this flip-flop, a binary three being added when it is in reset condition and being subtracted when it is in set condition. Flip-flop 100 is of the "Sample and Hold" type, previously mentioned, control being obtained through a B5 time sampling signal and the inverted WRS data signal, the right-shifted or "early scan" signal on line 98. If WRS is zero at B5 time, the output from flip-flop 100 is a 1, and vice versa. A "Not Correct" signal obtained by inversion of an AND gate 133 having state X6 and $\overline{\text{Carry R}}$ as its inputs, is used to reset flip-flop 100 and for other purposes referred to subsequently.

In state X6, where the correction is performed, the first digit of the falsely coded sum arrives at WRS during D8 time and the circulation path is sampled during B5; so if there is a "1" on WRS at that B5, the "Minus 3 Correct" flip-flop 100 is reset at the end of the digit time previous to appearance of the digit at W Out (since WRS is a one-digit early output from W Reg 96). During state X6, the output of AND gate 133 is true and enables AND gate 132, allowing the (B1 + B2) signal on line 31 to be the input to the adder and carry circuits via lines 129 and 129*a* from OR gate 126. Then, when the first two bits of W Out (normal output 97 of W Reg) enter the adder 125, a "1" will be present at the "B" input 129 to adder 125 at times B1 and B2, thus entering the desired binary 3 for correction.

The signal from the "Minus 3 Correction" flip-flop 100 enters a three-input OR gate 111 along with signals from AND gates 105 and 106, these signals being referred to as SUB-1 and SUB-2, respectively, and both of them calling for a subtraction of an amount in K Reg or F Reg from that in W Reg, as will be described later. OR gate 111, into which these three signals go, controls stream selector 112, to which both the W Out signal and its inverse are supplied by means of a connection to line 97 directly and through an inverter 113. These inputs are gated by stream selector 112 upon output from OR gate 111 such that the signal from inverter 113 will be selected for control of the carry circuits, the normal input being inhibited, and vice versa.

The Carry Flip-Flops (FIG. 9)

The input to the Carry B flip-flop 110 comes from Exclusive OR gating 112, the output of which goes to an AND gate 120 and to an OR gate 114. Gate 114 is fed by a B5 time signal (once per digit) — the purpose of which is to hold the carry signal till the next digit time — and by a separate signal coming from a two-input AND gate 115. Another Exclusive OR gating 116 delivers one of the two signals to AND gate 115; the other signal to that gate being the B5 signal from counter 28 (FIG. 3*a*). The gating 116 is fed by a signal SUB-3, generated by an AND gate 136, described later, and by the output of OR gate 126 (the "B" input to adder 125) with SUB-3 controlling gating 116 to pass the inverted output of gate 126, to gate 115; the direct (non-inverted) output otherwise being passed by gating 116. In either event, the $\overline{B5}$ input to AND gate 115 (resulting from presence of the inverter 103 on this input to the gate) excludes any possible interference by the decimal point information in K Reg or F Reg.

The outputs from AND gate 115, gating 112, and the B5 time signal go through OR gate 114, as mentioned above, to a two-input AND gate 118. The other signal fed to that AND gate comes from the feedback NOR gate 119, supplied by the unit delay of carry flip-flop 110 and D8B5 time as a reset signal. This last automatically resets flip-flop 110 at the end of a machine cycle.

The output from AND gate 115 and that from stream selector 112, as mentioned above, are also fed to a two-input AND gate 120. The two AND gates 118 and 120 have their signals fed to input NOR gate 121 of Carry B flip-flop 110, separated by unit delay from an inverter 122, developing the flip-flop output which goes to adder 125 as the carry input C on line 128 and also to several other circuits, as will be seen.

Accordingly, if there is no output from OR gate 111, indicating that the operation is addition, the signal W Out on line 97 will be chosen for output by gating 112. Similarly, because there will be no signal from AND gate 107 (not a subtraction), gating 116 will transmit the output of OR gate 126 on line 129*a*, and thus whenever there is a 1 on line 129*a*, as well as in W Out on line 97, flip-flop 110 will be set through AND gate 120. One bit time later, the set condition of that flip-flop will appear as one input to AND gate 118 through the feedback path from NOR gate 119. Then, if there is an output through OR gate 114, even if there is no output from AND gate 120 (either W Out or 129*a* having a 0 signal), flip-flop 110 is again set. Should there be 0 signals on both lines 97 and 129*a*, then neither OR gate 114 nor AND gate 120 would have an output to set flip-flop 110 again. If the carry input to AND gate 114 was generated during B4 time, the B5 signal through AND gate 114 would enable passage of the feedback signal through AND gate 118 to set flip-flop 110 and thus retain the carry's effectiveness till B1 time of the succeeding digit.

Conversely, if there is an output from OR gate 111, operation of flip-flop 110, corresponds to subtraction and thus the inverted output on line 97 ($\overline{\text{W Out}}$), will be chosen by gating 112 (through the AND gate and the second NOR gate, neither numbered) for passage. Other things being equal, flip-flop 110 will then be set through AND gate 120 whenever W Out is a 0 (output of 112 thus a 1) and 129*a* is at 1, or through AND gate 118 if there is a borrow from the feedback circuit and OR gate 114 has an output. It will be recalled that OR gate 111 gives a signal whenever there is an output from AND gates 105 or 106 or from the "Minus-Three Correction" flip-flop 100, these outputs being mutually exclusive. The sensing of a 1 on each of the inputs of flip-flop 100 (these inputs being WRS, inverted, and B5 and being 1, respectively, when there is no carry from addition at B5 time) will set flip-flop 100 and thus give rise to an output through OR gate 111 controlling gating 112 as described immediately above, OR gate 126 simultaneously giving signals to gating 116, as previously described, to control borrow generation through flip-flop 110 while adder 125 combines the inputs on lines 97a and 129 in the usual fashion.

The Carry R flip-flop 124 is a dynamic flip-flop which is also of the "Sample and Hold" type, but it is sampled at D8B5 time and set or reset according to the output of flip-flop 100 on line 128*a*. Thus, if there was a carry or a borrow from the fourth bit position at D8 time, which is indicative of an overflow or an overdraft, that fact will be available for control purposes during the whole of the next machine cycle. It may be remarked that the sampling signals for flip-flops 110 and 124 are the exact inverses of one another.

Decimal Point Return

The output from adder 125 goes to stream selector 95, the output of which goes to AND gate 94 (open only in X4 or X6) and from there to stream selector 93, as already mentioned. Another of the inputs to stream selector 95 is effective only at B5 time as shown by the input 135 controlling the signal stored at that time. Line 35 is connected to OR gate 127 which has three inputs, any one of which can operate. Only the first input to gate 127 is of concern at this time, the other two relating to subtraction, as described later. This first input combines state X6 and either "plus" or "minus"

keys 25*a*, *b* and K Out in AND gate 136. It is the implementation of the second instruction in box 87 (FIG. 7) and effects the desired re-entry of the decimal point in W Reg after correction. It can take place in the same machine cycle because detection of the contents of each fifth-bit position of W Reg is performed one digit time early by connection of the WRS output 98 to the "data" input (through inverter 103) of "Sample-and-Hold" flip-flop 100. K Out can be connect to W In through AND gate 136 and OR gate 127 without interference with correction during X6, or vice versa, it being recalled that B5, as a control input to stream selector 95, not only selects line 135 from OR gate 127 as the input to W Reg, but also inhibits any output from adder 125.

Subtraction

Since subtraction is merely a special case of addition in which the sign of one number is changed, its essence has substantially been explained in the foregoing. Note though that in the event of subtraction, certain logic elements (SUB-1, SUB-2, and SUB-3) come into play and affect the machine operation. SUB-1 is the intersection of $(X2 + X4 \cdot \overline{\text{Carry R}}) \cdot \text{P/MF} \cdot \overline{\text{MADD}}$, AND gate 105 of FIG. 9. Thus, for a SUB-1 signal to be 1, the machine must be in either state X2 or in state X4 while not having a signal from Carry R flip-flop 124, and also either the add or subtract key must have been depressed, as indicated by the set state of a flip-flop P/M (neither shown nor numbered, but conventional) and, lastly, the machine must not be subject to a magnitude addition control. Similarly, SUB-2 is the intersection of $X4 \cdot \text{P/MF} \cdot \overline{\text{MU}}$, AND gate 106 of FIG. 9, which means that in order for the SUB-2 signal to be a 1, the machine must be in the state X4, and there must not have been a depression of either the "plus" key 25*a* or the "minus" key 25*b* (reset state of P/M flip-flop) and also the multiply key 25*e* must not have been depressed. It is evident from the foregoing that SUB-2 is used only in division and, accordingly, will be discussed later. SUB-3 is the intersection of $X4 \cdot \text{P/MF} \cdot \overline{\text{MADD}} \cdot \text{Carry R}$, AND gate 107 of FIG. 9, and marks an abnormal condition where instead of the usual subtraction from the content of W Reg 96, there is to be a subtraction of the content of W Reg from the content of K Reg 40 or F Reg, that condition being established by the fact that the Carry R flip-flop 124 was set at the end of the trial subtraction performed in state X2 (corresponding to the description in box 85 of FIG. 7).

The point of especial interest to the present invention is that whether or not there is borrowing during subtraction affects the fifth bit of each digit in such a way that the proper correction is later made in exactly the same manner as the correction in addition. In other words, the fifth bit is also used to indicate a borrow from the digit to the left, but if there has been borrowing in a digit, its bit 5 is set to a zero; if there is no borrowing in a digit, its bit 5 is set to a 1, these settings being contrary to what was done in addition to mark presence or absence of a carry. Hence, the result is that during correction, presence of a 1 in bit 5 after subtraction (no borrow) results in adding 0011 to that digit and presence of a zero in bit 5 (borrow) results in subtracting 0011 from that digit, that is, the same correction system applies without modification in either addition or subtraction. Thus, if the operator wishes to subtract 5 from 12, the machine first subtracts binary 8 (5 in "excess-three" code) from binary 5 (2 in "excess-three" code) and borrows from the next higher digit — as follows, in the excess-three system:

| | TIME: D2 | D1 |
|---|---|---|
| W before | 00100 | 1 0101 |
| K Reg | − 00011 | − 11000 |
| W after | 10000 | 01101 |
| W correction | + 0011 | − 0011 |
| Result | 00011 | 01010 |

The logic for producing the above effects is shown in FIG. 9 and involves OR gates 108 and 127. OR gate 127 has three inputs, the first of which was described previously and will not be discussed further, even though it is also effective in X6 after correcting of results of subtraction. The second and third inputs come from two AND gates. The second is SUB and "Not Carry B," AND gate 138, and the third is "Not SUB" and "Carry B," AND gate 139. SUB here means either SUB-1 or SUB-2 or SUB-3, the logic elements described at the start of discussion of subtraction which identify all the possible circumstances under which a subtraction of two of the numbers stored in W Reg and K Reg or F Reg must take place in the calculator. SUB is the signal at the output of OR gate 108, which has the AND gates 105, 106 and 107 as its inputs.

In the above example, it will be noted that there was a borrow at B4 time of D1 time, which borrow is stored as a 0 in the fifth-bit position, and that there was no borrow at B4 time of D2, which fact is indicated by storage of a1 in the fifth-bit position of that digit. The dotted lines around the 1 in the fifth bit of D1 in the row identified as "W before" are again present to indicate that the decimal point in W Reg is lost in this process, though still present in K Reg at the proper location because of the alignment earlier. Then during the correction cycle in state X6, the "0" in "W after" sensed at WRS (line 101) at B5 of D8 time — WRS being a one-digit early scan of W Reg, it will be recalled — effects the setting of "Minus Three Correction" flip-flop 100 to cause subtraction of the binary three during D1 time, whereas the "1" sensed at WRS during B5 of D1 time, effects resetting of flip-flop 100 with the result that the binary three is added during D2 time.

The storing of reversed symbols for borrow and no-borrow as compared to carry and no-carry is performed through OR gate 108 (FIG. 9) which has a signal on its output whenever a subtraction is being performed in states X2 or X4, as determined by the outputs of AND gates 105, 106 and 107 connected to it. OR gate 108 is connected to two AND gates, one directly and the other after inversion. AND gate 139 has two inputs, one the direct input from OR gate 108 and the other coming from a line 109 connected to the output of the unit delay in flip-flop 110, (i.e., before passing through inverter 122 which supplies the Carry B signal on line 128 to adder 125). The line 109 thus supplies the signal $\overline{\text{Carry B}}$. Accordingly, during each B5 time of a subtractive machine cycle, through AND gate 139 the inverted Carry B signal will pass through OR gate 127 to line 135, chosen by stream selector 95 at that time, the input from adder 125 being simultaneously inhibited, of course. Conversely during an additive machine cycle, another two-input AND gate 138 having the inverted output of OR gate 108 as one input and the normal output of flip-flop 110 (the above-mentioned output of inverter 122 on line 128) will be effective to pass the Carry B signals through OR gate 127, line 135 and stream selector 95 at B5 time.

The effects of the fifth bit signals during correction having been described previously for addition and being absolutely identical during subtraction, will not be described anew.

Figure 10A:
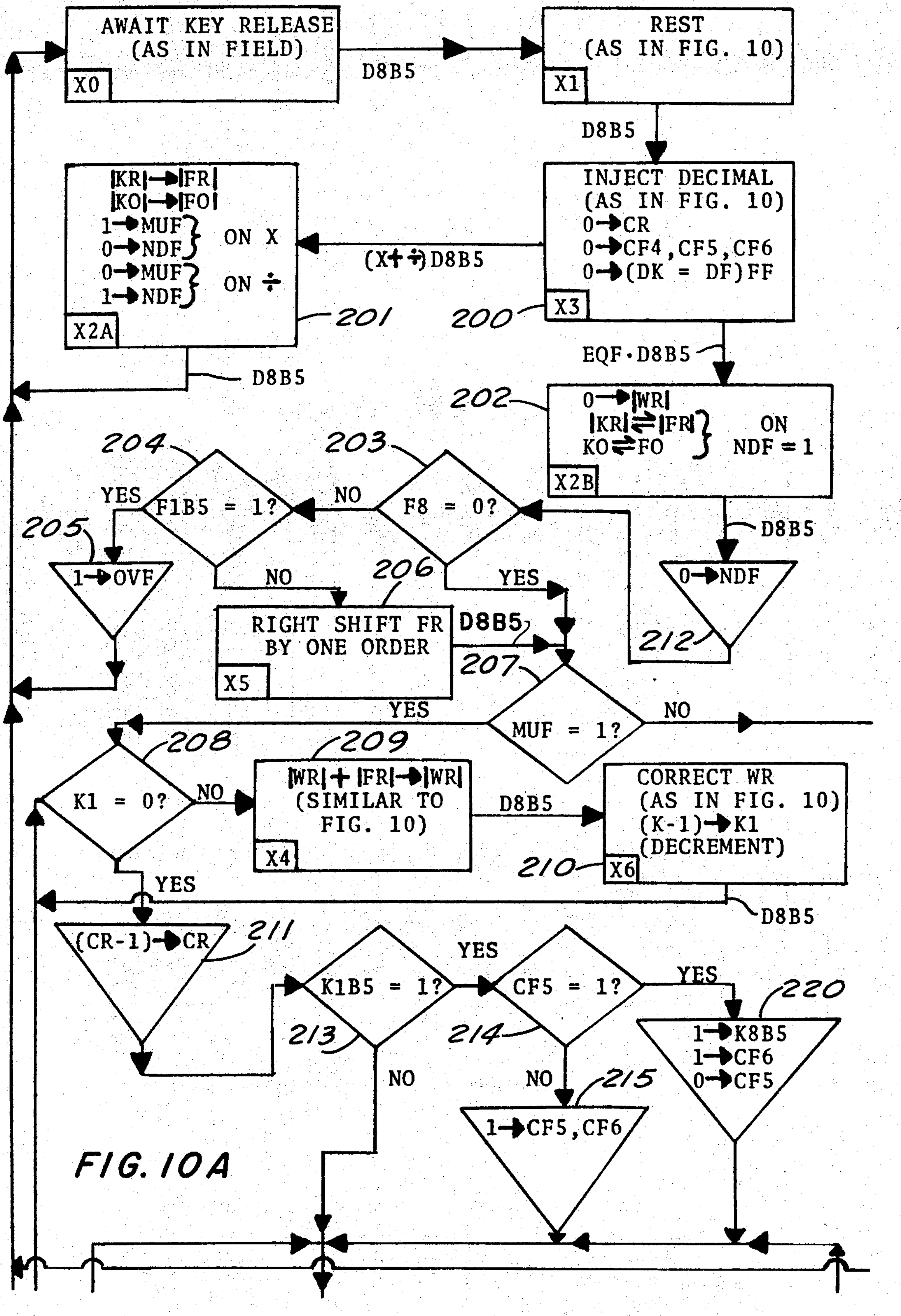
FIGS. 10A,B,C is a flow diagram of the multiplication and division routines embodied in the present invention.

Multiplication (FIGS. 10A, B)

While multiplication involves different logic circuits from those used in addition, there are fewer changes than one might think, since multiplication is really a special case of successive additions combined with right shifts, being carried out least significant multiplier digit first (left shifting and most significant multiplier digit first might also be employed, as is known, but are not preferred). Thus, to multiply 23 by 12, 23 is first multiplied by 2 to give 46, then the answer is shifted to the right and 23 is multiplied by 1, giving 23, which is then added to the right shift 46 to give 276.

In multiplication, a fourth register known as the "second factor" register or F Reg is employed, the A register being retained for possible accumulation of results. Thus, the three registers employed in multiplication are K Reg, W Reg, and F Reg. A multiplicand is first entered in K Reg; it is then transferred by the machine to F Reg when the "multiply" key **25*e* is pressed. Then the multiplier digits are entered into K Reg through keys 23. Finally, the multiplication operation is performed by pressing the "equals" key 25*d*. In this machine, after obtaining his result, the operator can enter a new number, depress the "=" key 25*d*** and obtain a new product, based on the first factor in his original multiplication (i.e., constant factor operation), repeating this as long as desired.

During multiplication the operation is carried on in W Reg by first transferring into W Reg the number that is in F Reg if, and only if, the number at the extreme right-hand position of K Reg is greater than zero. Depending on the magnitude of this right-most digit of K Reg, the number in F Reg is added a corresponding number of times in succession. That is, in the example of multiplying 23 by 12, 23 will first be added into W Reg twice to give the multiplication by the right-most digit 2.

The next step is to shift both W Reg and K Reg to the right. For this purpose, these two registers are treated as segments of a single register and the digit shifted to the right out of W Reg enters the left-most position of K Reg, but the digit shifted out of K Reg is simply lost. Thus, in this example, before the shift one would have had a value of 46 in W Reg and a value of 10 (counted down) in K Reg. After the shift, W1 will be 4, K8 (in an eight-digit calculator as described herein) will be 6, and K1 will be 1, with all other K digits zeros. Then, the number in F Reg (which is not shifted) is again added into W Reg the number of times indicated by the new digit in K1, so that this will be 23 added once to 4 to give 27 in W Reg, while K8 remains at 6. Then the product is again shifted to the right to give 2 in W Reg and 76 in K8 and K7 of K Reg. If there were another non-zero value in the K Reg multiplifier position (K1 digit), it would then be effective. If not, right shifting continues until the right-most digit of the product is in the right-most position of K Reg and, in an eight-digit system, the K Reg content will then be 00000276. (There are some exceptions that will be noted later.)

At each multiplier digit, the successive additions are controlled by the result of decrementation of that digit. The machine always asks the question "Is K1 zero?" and, if not, adds F Reg to W Reg and decrements K1 by 1. If K1 is still not zero, then the machine again adds F Reg to W Reg and again decrements K Reg by 1. When K1 is zero, there is a right shift instead of the addition and decrementation. So the operation continues with additions from F Reg until K1 becomes zero, and then a right shift occurs, the next multiplier digit then being counted down in the same manner while F Reg is added.

A counter CR counts the multiplier digits (i.e., the right shifts) until it has counted through all orders of the register (eight right shifts in the embodiment described). If the multiplication is between whole numbers and there is no problem of the produce exceeding the capacity of the machine, then that completes the operation and the product is displayed. But if, after eight multiplier digit shifts, there is still a non-zero digit left anywhere in W Reg or if the true decimal has not yet been set, then there will be another right shift — unless there is a decimal point at the right-most digit of the K Reg, in which case there is an overflow indication, showing that the product is too great for the machine.

Because W Reg and F Reg are identical in capacity, an overflow is also indicated whenever F8 is not zero, even though the product might be within the actual capacity of the machine (i.e., no carry from the partial product digit in W8, but chance of this is less than half). This greatly simplifies the circuits by first asking only the question "Is F8 zero?" If the answer is no, and there is a decimal point in F1, then a right shift is not possible and the overflow condition can be immediately indicated. Further, if something is left in W Reg after eight shifts have taken place (that is, the number of shifts corresponding to the number of register digits in the machine) and the true decimal point has still not been put in its proper place along the K Reg digits, then right shifting is continued until proper decimal point placement occurs. Accuracy of the final figure is affected, but only one of the less significant product digits is dropped for each additional shift past eight.

In multiplication, the addition itself and correction of the tentative sum according to the excess-three system are obtained in the same basic manner as that already discussed for ordinary addition, with the modifications already noted. There is no need to align figures as to decimal points since the machine is always adding directly from F Reg to W Reg and alignment is not in question.

The principal novelty in the present invention, so far as multiplication is concerned, is the handling of the produce decimal point, which once again relies on the fifth bits. During multiplication, W Reg may be considered as not having any decimal point indicator at all, the fifth bit being used (as in addition) for indicating carries. What the machine does is this: it shifts the multiplier digits and decimal point to the right in K Reg, counting down each new multiplier — the digit in K1, the right-most ordinal position — after each shift of K Reg. As soon as the K decimal point is shifted out of K Reg, the decimal point from F Reg is copied into K Reg as a marker or "pseudo-decimal" point at the same relative position which it occupied in the F Reg, i.e., "analog" addition of the decimal point positions. This pseudo-decimal point then shifts to the right at each right shift of the K Reg and W Reg contents, and when it reaches the right-most position of K Reg, the "true" decimal point is entered into K8 just before K Reg shifts to the right. This true decimal point is then shifted to the right along with the partial products until the product reaches its final position.

Thus, if one is multiplying two whole numbers, the very first right shift of K Reg shifts its decimal point out, and a marker or pseudo-decimal point is entered at K1 — the right-most digit position, the original K2 digit now being located therein — incorrespondence with the location of the F Reg deciaml point. Before the next right shift, that marker is sensed and a decimal point is entered into K8, which now contains the least significant digit of the partial product of the multiplicand by the least significant digit of the multiplier. The countdown of multiplier digits continues until eight shifts hav been made, and then the final product appears in K Reg with the decimal point at K1. The final placing, to repeat, is achieved by entering the decimal point into K8B5 upon detecting the marker in K1B5, but before the right shift that carries the marker out from K1B5. Note the difference between this operation and the copying of F Reg decimal point into K Reg to provide that marker, copying having occurred after the right shift in the latter case. The difference in treatment is desirable because it affords simplification by obviating the need for an additional timing signal — namely, K7B5.

When either of the numbers to be multiplied has a digit following the decimal point, the operation is carried on in the same basic way and properly locates the decimal automatically. Thus, if one is multiplying 31.24 by 75.707 (first factor in F Reg and second factor in K Reg), the K Reg decimal point is originally at K4B5, and the operation will require four shifts of the K Reg before the original K Reg decimal point is shifted out and the F Reg decimal copied to insert a marker at K3B5 of K Reg (since the F Reg decimal is here at F3B5) after the right shift. After two more right shifts (a total of six right shifts, therefore), this pseudo-decimal point reaches K1B5. Before the next right shift, a decimal point is entered in K8B5, there being at that time five digits of the product to the right of K8; so the decimal point is correctly located. Thereafter, the decimal point continues to shift with the digits of the number for the rest of the eight required shifts and as many more shifts as are necessary to empty W Reg of digits greater than zero (except when machine capacity is exceeded, as explained previously).

From the foregoing, it will be evident that proper placement of the decimal point is achieved in this embodiment by entry of the product decimal point at the most significant order of the less significant half of the double-length product register (W Reg and K Reg coupled) after a number of shifts equal to one less than the sum of the number of digits to the right of the decimal point storage position (recalling that the decimal point is stored to the left of the digit with which it is associated on the right during display).

Reference can now be made to the flow sheet, FIG. 10A,B for a more detailed explanation of multiplication.

States X0 and X1 are as they were in addition, except for the use of the F Reg. During state X3, box 22, the counter CR is cleared. Also, in state X3, a zero is copied into three decimal point location control flip-flops CF4, CF5, and CF6, of which only CF5 and CF6 are used in multiplication.

The change from state X3 to a state corresponding to X2 can in this instance be either of two things, one leading to a state X2A, box 201, and the other to a state X2B, box 202. State X2A is obtained when the function key pressed after entry of a number is either the "multiply" key or the "divide" key, the change to that state taking place at D8B5. Thus, if a number is entered in K Reg and then either the "multiply" key *25e* or "divide" key *25f* is depressed, at D8B5 the sequence moves to state X2A. There, the number (multiplicand) is copied from K Reg into F Reg, still leaving it in K Reg at that time though it will be cleared upon entry of a new digit thereafter, as previously mentioned. Also, the sign of K Reg is copied into the sign indicator for F Reg (not shown, but a flip-flop similar to those previously described). Further, a multiply flip-flop MUF (not shown, but again a dynamic flip-flop) goes to "1" if it was the "multiply" key *25e* that was depressed or else goes to "0" if it was the "divide" key *25f* that was depressed. Similarly, a zero goes into a "new divisor" flip-flop NDF (also not shown, but also a dynamic flip-flop) when the "multiply" key is depressed and a 1 goes to the "new divisor" flip-flop NDF when the "divide" key is depressed. On the next cycle, at D8B5 the machine is returned to state X0 and upon key release progresses again up to the rest state X1 as before.

Now, when the "equals" key *25d* is depressed after entry of the multiplier, the machine moves into state X2B (box 202) at the next D8B5 time. In this state, zero is copied into all digits of W Reg; in other words, W Reg is cleared. (During division only, when NDF = 1, K Reg and F Reg — including the signs, K0 and F0 — interchange with each other, but this does not happen during multiplication.) After one cycle (next D8B5 time), the "new divisor" flip-flop NDF is set to zero, whether or not there is a division. Then the machine asks the question, 203, FIG. 10A: "Is F8 equal to zero?" In other words, the machine is set to actuate in either of two ways, depending on whether there is a digit equal to zero in F8. If F8 = 0, the multiplication can proceed immediately; if not, it can proceed only after an initial right shift of F Reg. If there is a digit other than zero in F8, the answer to the question is "No," and the machine thereupon asks another question, 204: "Is F1B5 equal to 1?" to determine whether there is a decimal point in the F1 position, because if that is the case, then there cannot be a right shift. So, as shown at 205 in FIG. 10A, a "Yes" answer to this second question places the overflow flip-flop in the "1" condition and returns the machine to the X0 state. In other words, eight digit integral multiplicands cannot be multiplied by the machine.

If, however, there is no decimal point in the F1 position, then, 206, a right shift can take place with the least significant digit in the number being dropped. After F Reg is right shifted one place, F8 must equal zero and the operation can go on. There is a minor loss of accuracy, but the operation is unequivocally placed within the capacity of the machine.

If, with or without such a right shift, when the question, "Is F8 = zero?" is asked, the answer is "Yes," then the machine goes to a new question, 207, "Is the multiplier flip-flop MUF equal to 1?" In other words, is the operation a multiplication? If the answer is "No," then a division is indicated and what happens is dealt with subsequently under the section on Division. If the answer is "Yes," the routine proceeds immediately to the next question, 208, "Is K1 a zero?" If K1 is zero, then obviously the product of K1 times what is in F Reg will be zero, and there should be no addition in W Reg from F Reg. Hence, the machine goes to a right shift with a decrementation of the CR counter, as described in detail below.

If the digit in K1 has a a value other than zero, the number in F Reg is to be added to W Reg at least once. Therefore, a "No" answer leads to state X4, 209, which is similar to that in FIG. 7, except that here F Reg, rather than K Reg, is added to W Reg, the result again being placed in W Reg. Once the tentative sum is in W Reg, the excess-three correction must be performed in state X6, 210, at the next D8B5 (just as described in connection with FIG. 7). In State X6 during multiplication, K1 is also decremented by 1. After this correction and decrementation, on the next cycle at D8B5, the question is again asked, 208: "Is K1 zero?" If not, the machine goes back to state X4, repeating this just-described loop until K1 has been decremented to zero. If we are multiplying by 9, this will take nine passes, so that the number in F Reg will be added into K Reg nine times — or in other words the number in F Reg is multiplied by 9 via nine successive additions.

Clearly, the digit in K1 having been decremented to zero, it is now time to shift to the right to bring the next digit of the multiplier into the K1 position. As pointed out, though, the machine first decrements, 211, counter CR by one. This counter Cr is to count eight places; it is started at zero and the first "decrementation" moves it to 7 (8 and zero being the same thing in a three-bit counter, as is known).

After decrementing the counter, the machine next asks the question, 213: "Is K1B5 a 1?" This means, "Is the decimal point at the right in K Reg?" One must know this before the first digit is shifted out. If the answer is "No," the operation proceeds to shifting, as will be seen, but if it is "Yes," then the machine performs a novel operation, using the two flip-flops CF5 and CF6, previously mentioned, which have the following logical chart:

| State | CF5 | CF6 |
|---|---|---|
| 1. Initially | 0 | 0 |
| 2. Causes DF to go to DK after right shift on K1B5 = 1 | 1 | 1 |
| 3. From end of DF going to DK, to 1 going to K8B5 (final decimal insertion) | 1 | 0 |
| 4. After 1 goes to K8B5 | 0 | 1 |

From the logic table, it will be seen that initially CF5 and CF6 are both zero, having been placed in that condition at state X3. Thereafter, various operations take place, depending on whether both of them are zero or only one is zero, and in that case, which one is at zero. Thus, when there is a decimal point at K1B5, certain things are done before the right shift. The question is first asked, 214: "Is CF5 at 1?" When CF5 is zero at this stage, it means that the CF5, CF6 flip-flops are still in their initial state, and the decimal point from F Reg is to be copied into K Reg. In order to do that, both CF5 and CF6 must be at 1. Accordingly, if the answer to the above question is "No," then a 1 is placed in both CF5 and CF6, 215, and the operation continues on to the right shifting, which in this instance takes place in two cycles of the Digit Counter because of the doubled length of the coupled registers W and K. From the standpoint of logic, we can consider that one-half of the right shift takes place in a first cycle and one-half in a second cycle. The reason for using two cycles is to enable certain operations to take place successively, but during the shift time. The preparations for right shifting are such taht W8 will always be zero after the right shift, and K8 after the shift will be whatever W1 was before the shift. When CF5 and CF6 are both 1, then after the shift in the first cycle, 216, the decimal bit positions of F Reg are copied, 217, into the decimal bit positions of K Reg with the result that a "1" appears in the fifth bit positions of K Reg at the same order where it appears in F Reg. Then, after the next cycle at D8B5, the other half of the right shift is completed, 218, and a zero is copied, 219, into CF6 if CF5 was 1 before. That is, the machine moves from the second stage of the CF5, CF6 chart to the third stage at this time.

On the other hand, if the answer to the last question is that CF5 is at 1, that means the machine is at the third stage and ready for the fourth stage of the chart, because if CF5 is 1, K1B5 will be 0 except at the time when the marker is detected in K1B5 and the change from the third stage to the fourth stage is to be made. At that time, 220, the machine enters a 1 into K8B5 for the "true" decimal insertion, placing a 1 in CF6 and changing CF5 to a zero to identify that occurrence before going to the right shift. This is a very important feature of the invention.

On the D8B5 at the end of the right shift the question is asked, 221: "Is CR equal to zero?" This means, "Has the counter now counted down all the way through its eight steps?" If not, there is a return to X4 to go through the next stage of multiplication by the next digit. If CR is equal to 0, then another question is asked, 222: "Is WR equal to zero?" This means, "Is there any non-zero digit left in the W Reg?"

If WR is zero, a further question is asked, 223: "Is CF6 equal to 1?" Since CF5 must equal 0 if CF6 equals 1 at this point, a "Yes" answer here means that the final decimal point has been located, and then the machine compares the signs of K Reg and F Reg, 224. If they do not have the same sign, then the answer should have a negative sign and K0 goes to 1, producing a negative sign on the machine display. If K Reg and F Reg have the same sign, then K0 is zero (or is reset to that value), and the sign of the product is thus a plus. The operation is then complete, and the machine returns to stage X1 via stage X0.

If CF6 is not 1 at this point, then the question is asked, 225: "Is K1B5 = 1?" In other words, is there a marker at the K1 position? If there is not, the machine then performs a right shift by returning to states X12 and X14. If K1B5 is 1, meaning that there is a marker at the right of the K Reg digits, then since CF6 is not equal to 1, this means that CF5 is equal to 1 at this point. This, in turn, means that the routine is now at stage 3 of the CF5, CF6 chart and is ready for insertion of the decimal point and transition to stage 4. So, 226, the true decimal point is inserted at K8B5, CF6 is then changed to 1, and CF5 is changed to zero, as before, but now K1B5 is changed to zero, and then, going through the sign comparison stage, 224 (also as before), the machine returns to X0 and X1 because the operation has been completed, no further right shift being desirable since it would lead to unnecessary loss of a significant digit.

If WR is not equal to zero at 222, then there are one or more other digits, and further the final decimal point may need to be dealt with, the next question asked being, 227: "Is CF6 equal to 1?" If CF6 is not equal to 1, the machine returns to state X12, goes through another right shift, and then again asks the above questions. If, however, CF6 is equal to 1 at this point, then the machine asks the question, 228: "Is K1B5 equal to 1?" and if it is not, again the machine returns to state X12 and a right shift is made. If K1B5 equals 1, there is an overflow condition, 229, so the overflow flip-flop OVF is set and the machine goes through the sign comparison stage, 224, back to state X0 and then to rest state X1.

In view of the fact that the circuitry of the addition mode has been explained, it is not necessary to go through the details of the addition circuitry here, since it will be apparent now to one who is skilled in this art. The circuits for shifting in multiplication also will not be described in great detail, being well known in the art. There are some differences, however, and these will now be discussed.

As to shifting, this merely depends on the operation of the stream selectors 93 and 44 to connect the $\overline{KRS}$ output 39 (FIG. 4) of K Reg 40 to the input of W Reg 96 (FIG. 8) and to connect the W Out line 97 to the input of K Reg 40, respectively. The former is accomplished through an Exclusive OR combination of gates comprising two-input AND gate 91 having the signal Mu from the set output 99 of the multiplication flip-flop MUF as the input paired with line 39 and having its output connected to a two-input NOR gate 170, the other input of which comes from another NOR gate 169, which is active in division, as described later, but is inactive so long as the MU signal is present on line 99. Under these conditions the $\overline{KRS}$ signal will pass through gate 170 with an inversion, thus presenting the signal KRS to an AND gate (not numbered as it forms part of stream selector 93) along with the signal S4, described below, as a controlling input, this signal being present during shifting.

Figures 10, 10B:
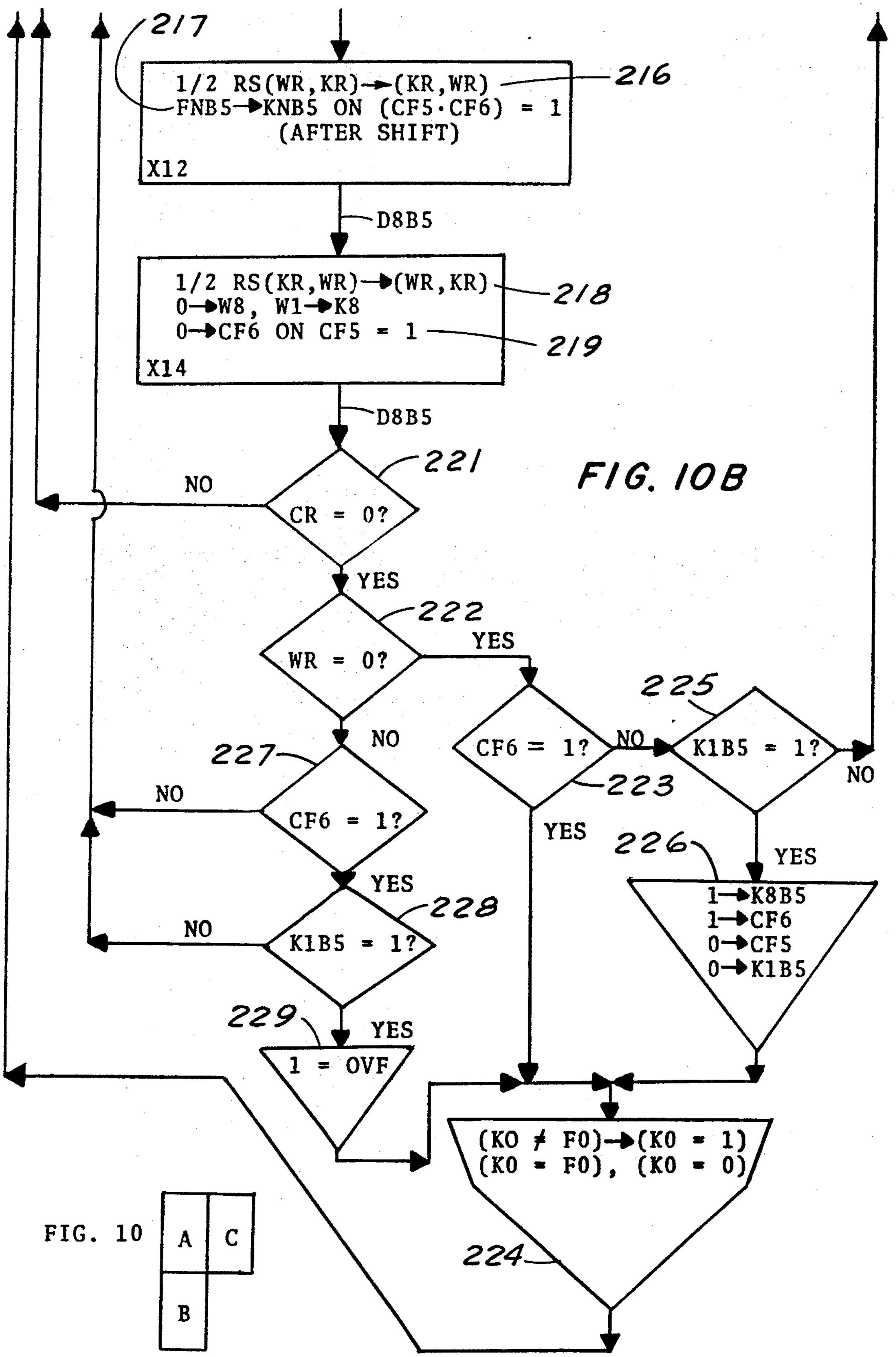

Supplying W Out to the input of K Reg 40, on the other hand, is accomplished (FIG. 4) by connecting W Out on line 97 to a two-input AND gate 98 along with the signal S4 on a line 36 from Sequence Control 35 which passes through a two-input OR gate 49, in this instance. The signal S4 comes from the set output of a flip-flop (mentioned earlier) having a weight of eight in Sequence Control 35 and, hence, this output will be true whenever the machine is in states X12 or X14, that is, the states for shifting the coupled W Reg and K Reg combination during multiplication or division. As can be seen in the flow sheet diagram for multiplication (FIG. 10B), the right shifting of K Reg and W Reg takes two machine cycles when they are coupled, and, accordingly, a first half of the right shift (during which K2–K8 and also W1 enter the eight digit positions of W Reg through AND gate 91 and W1–W8 enter K Reg) occurs in state X12 and a second half of the right shift occurs in state X14 (during which K2–K8 and W1 are returned to K1–K8, while the KRS output sends W2–W8 to W Reg during D1–D7 again through AND gate 91, and a "zero" enters W Reg during D8, through a two-input AND gate (unnumbered, as it forms part of stream selector 94) having the (B1 + B2) signal on line 31 as one input and at D8 time a signal from AND gate 155, which is enabled during X14 in multiplication. The input from stream selector 93 will be inhibited during all of D8, in known fashion, thus entering zeros during B3 and B4 of that period. This completes the shift.

Figure 11:
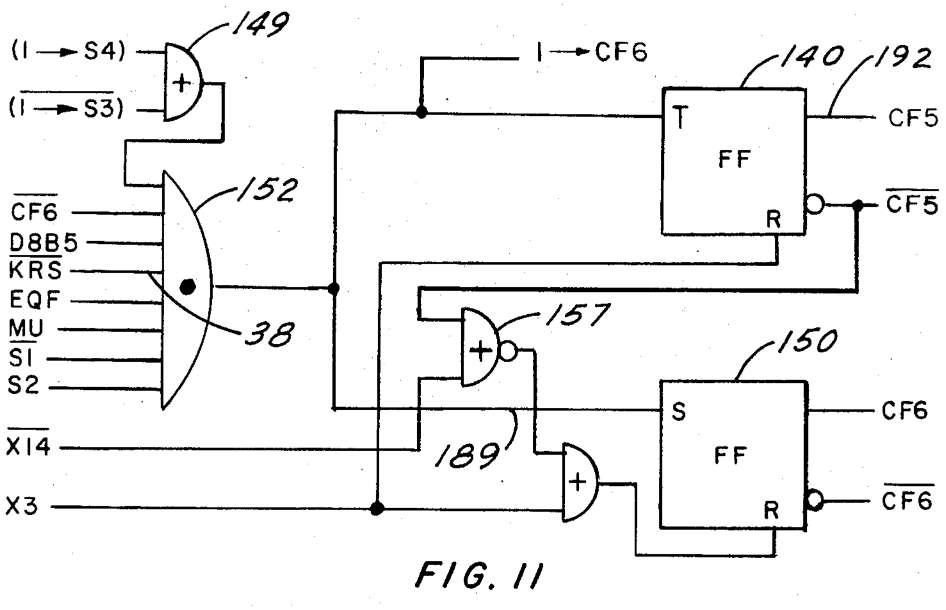
FIG. 11 is a logic diagram showing the decimal control elements for multiplication.
Figure 12:
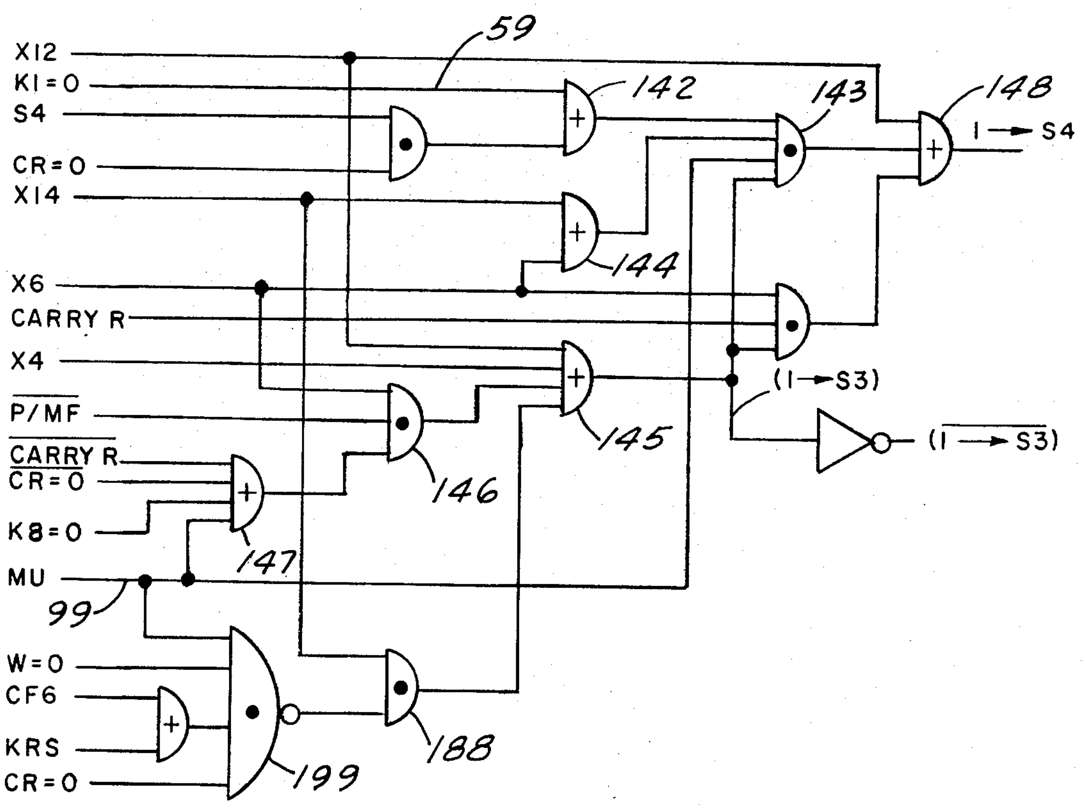
FIG. 12 is a logic diagram of the elements for generation of sequence control signals utilized in the decimal controls of FIG. 11.

As to the entry of the marker and the true decimal point, the circuitry for accomplishing this is as follows. Detection of a bit in the fifth position for the first ime, denoted by K1B5 = 1, with toggling flip-flop CF5 (a known type) in its reset condition. as previously described, must result in flip-flops CF5 and CF6 both being changed to the true condition. This is accomplished at D8B5 time, as follows. By means of a state X3 output, from Sequence Controls 35 supplied as a preclear input (FIG. 11) on a line 141 to the reset input of CF5 flip-flop 140, that flip-flop will be initially in its reset condition. Then when the K1 digit (least significant multiplier digit) has been counted down to 0 in X6, at D8B5 time there will be a signal at the output 59 (FIG. 6) of a NOR gate sampling the outputs K1B5 and K1B4 of buffer 42. This signal will be supplied (FIG. 12) through an OR gate 142 to a four-input AND gate 143. The other three inputs to AND gate 143 — X6 through OR gate 144, a "(1 → S3)" signal from an OR gate 145, the purpose of that signal being to set the third flip-flop of the Sequence Controls 35, and MU on line 99 — will all be present at this time. The "(1 → S3)" signal will arise in this case through three-input AND gate 146 having as inputs X6, P/MF and MU (previously described) and all being true at this point in a multiplication, the last coming through four-input OR gate 147. Accordingly, all inputs to AND gate 143 being true, there will be an input to OR gate 148 which will pass through another OR gate 149 (FIG. 11) to one of the eight inputs of an AND gate 152. As to this latter AND gate, since CF6 flip-flop 150 is in its reset state initially; the KRS input on line 38 must be 1 if the decimal point was detected in the fifth bit of K1; the "equals" flip-flop EQF (not shown, but set by depression of the "equals" key 25*d*) and the multiplication flip-flop MUF must be set during multiplication; and the first and second flip-flops, S1 and S2, of Sequence Controls 35 must be respectively in their reset and set states during state X6, all of the inputs to AND gate 152 will be true and there will be an output, thus toggling flip-flop 140 to its true condition and setting flip-flop 150. The CF6 flip-flop 150 will be set simultaneously through a direct line 189*a* from AND gate to its set input. Note that though the reset inputs to flip-flops 140 and 150 take effect immediately, setting (or toggling) occurs after one bit of delay. Flip-flop 140 is reset only in X3, whereas flip-flop 150 is reset through an OR gate 156 which has two inputs connected respectively to the X3 output of Sequence Controls 35 (see FIG. 3B) and to a NOR gate 157 (FIG. 11) connected to the inverted output of CF5 flip-flop 140 and to the X14 output of Sequence Contols 35, the output of NOR gate 157 being a "0" throughout X6.

Flip-flops 140 and 150 having both been made true, as above described, at the D8B5 time which causes entry to the first shift state X12, the copying of the fifth bits of F Reg into the shifted contents of K Reg will now be described. In FIG. 8, a four-input AND gate 158 is connected to stream selector 93, such that the F Out signal on line 159*a* at the output of F Reg 160 is supplied to W Reg (for reasons which will be clear shortly) at B5 time when both the CF5 and CF6 flip-flops 140,150 are true, as they are at this point. It will be recalled from earlier description of the multiplication process that a double register shift takes place in X12 and X14 during which the input to W Reg comes from the right-shifted output KRS of K Reg 40, appearing on line 39 (after inversion) and passing through gate 99 to stream selector 93. Thus, during X12, to transfer the decimal information in F Reg to K Reg, that information must be entered into W Reg, because this last is being supplied with the right-shifted K Reg data during that sequence state. To complete the right shift, as mentioned previously, at D8B5 time the sequence goes to X14, in which state the shift continues with W Reg contents (now the shifted K Reg contents together with W1 in the most significant position) being supplied to K Reg through AND gate 98 (FIG. 4) as before. There will be no further recording of the fifth bit position data from F Reg to W Reg through AND gate 158 (FIG. 8), because an output from NOR gate 157 (FIG. 11) will occur before B5 time of D1 period in X14, and immediately reset CF6 thus removing one of the four signals necessary for output from gate 158.

A marker having been inserted among the K Reg digits to mark a position corresponding to the location of the decimal point in F Reg, the multiplication process continues as before, with the K1B5 position being scanned each time the K1 digit is found to be at 0, either upon shifting into that position or upon counting down during the repeat additions. When a "1" is detected in that bit position of the K1 digit, then the marker has been located and the true decimal must be inserted in K8 as previously described. The structure for accomplishing this is as follows.

The count-down to "0" having occurred during states X4 and X6 or a "0" being present after a shift in X12 and X14, then through the previously-described OR gate 144 (FIG. 12) a signal will pass to four-input AND gate 143, which has its other three inputs true because of the output of the multiply key flip-flop on line 99, a signal K1 = 0 on line 59 passing OR gate 142, and a signal (1 → S3) from AND gate 146 just after X6 or through a NAND gate 188 after X14. Gate 188 has two inputs, one from state X14 of Sequence Controls 35 and the other from a large NAND gate 199 having as inputs the zero condition of the CR counter; the output of a "W = 0" flip-flop (not shown, but a dynamic flip-flop similar to others described herein) which is set at D8B5 time and reset if there is a non-zero digit in any order of W Reg, in known fashion; the set condition of CF6 flip-flop 150 or a "1" output on KRS line 38; and, lastly, the set condition of the multiply flip-flop, MUF, on line 99. Thus, the output of NAND gate 199 is true except when all five inputs are true, which is not the case at the time under discussion. The output of AND gate 188 will be correspondingly true, then, during X14 to give a signal through OR gate 145, thus generating the (1 → S3) signal, mentioned above. With all inputs to AND gate 143 being true, the signal (1 → S4) will pass through OR gate 149 (FIG. 9) to AND gate 151. At D8B5 time, flip-flop 150 having been reset as described earlier (the settings of flip-flops 140,150 thus corresponding to stage 3), the sensing of a "1" in KRS (i.e., K1B5) with both "equals" flip-flop EQF and flip-flop MUF set, and S2 set, but S1 not set, this combination will again cause a signal to appear at the output of AND gate 152 and to pass through enabled AND gate 152 in order to toggle flip-flop 140 to its reset condition and to set flip-flop 150, i.e., bringing the two flip-flops to stage 4, an indication that the permanent decimal was located.

It should be noted that the signal from AND gate 151 is coextensive with the signal D8B5 controlling the signal from AND gate 152. Also, line 189 goes to two places: a two-input NOR gate 190 (comprising part of element 41) having $\overline{KRS}$ on line 39 as the other input (FIG. 6), and a two-input AND gate 191 (FIG. 4) connected to stream selector 44, the other input to gate 191 being a line 192 from the set side of flip-flop 140. The input to NOR gate 190 provides entry of a "0" in K1B5 whereas the gate 191 enters a "1" in K1B5, recalling that the signal on line 189 is coextensive with D8B5 and that stream selector 44 controls entry to K Reg. It should be noted that NOR gate 190 is really necessary only under the conditions (shown at 221–223 in FIG. 10B) where eight shifts have taken place (CR = 0), the W Reg is clear, and the routine is still in stage 3 of the decimal controls CF5, CF6. Under these conditions, the true decimal point not having been located as yet, the KRS signal ("early scan") may reveal the presence of the marker in K1B5, requiring insertion of the decimal point through AND gate 191 (FIG. 4, as usual, but no shift being desired because this would cause unnecessary loss of the least significant digit of the product. Thus, the input of the (1 → CF6) signal on line 189 is used to erase the marker, and this is done in all cases even though ordinarily unnecessary because the marker will disappear on the next right shift.

Division

Division is, of course, the inverse of multiplication, and just as multiplication is performed by a series of additions, so division is performed by a series of subtractions, and once again W Reg and K Reg are coupled, but with left shifting from K Reg into W Reg this time. As before, attention will be paid primarily to the decimal point relation, but the operation will be explained so it will be clear where that fits in.

The relationship between multiplication and division in the machine is shown by the following four equations:

$$1 \longrightarrow MUF = ICC + \text{“X”}$$

$$0 \longrightarrow MUF = \text{“÷”}$$

$$1 \longrightarrow NDF = \text{“÷”}$$

$$0 \longrightarrow NDF = MU + (X2 \cdot EQF \cdot ND) \cdot D8B5$$

Thus, the multiplication flip-flop MUF is set to 1, on pressing the multiply key (and also on initial clearance), and is reset to zero upon pressing the division key. Similarly, the "new divisor" flip-flop NDF is set to 1 by pressing the division key and is reset to zero at D8B5 either on multiplication or in state X2 when the "equals" key has been pressed and when a "new divisor" signal is present as indicated by the signal ND from the "new divisor" flip-flop. The presence of the new divisor signal in this resetting operation may seem redundant, but it is used to generate an exchange between the F Reg and the K Reg that will be commented upon soon. It avoids that exchange on multiplication.

In this machine, the operator first presses digit keys to enter a dividend number in K Reg, then presses the "÷" key 25*f*, next enters the divisor, and finally presses the "=" key 25*d* to obtain the quotient. After obtaining this quotient, he can then enter a new dividend, and has only to press the "=" key 25*d* to obtain a second quotient without re-entering the divisor, (i.e., "constant divisor" operation).

Figure 10C:
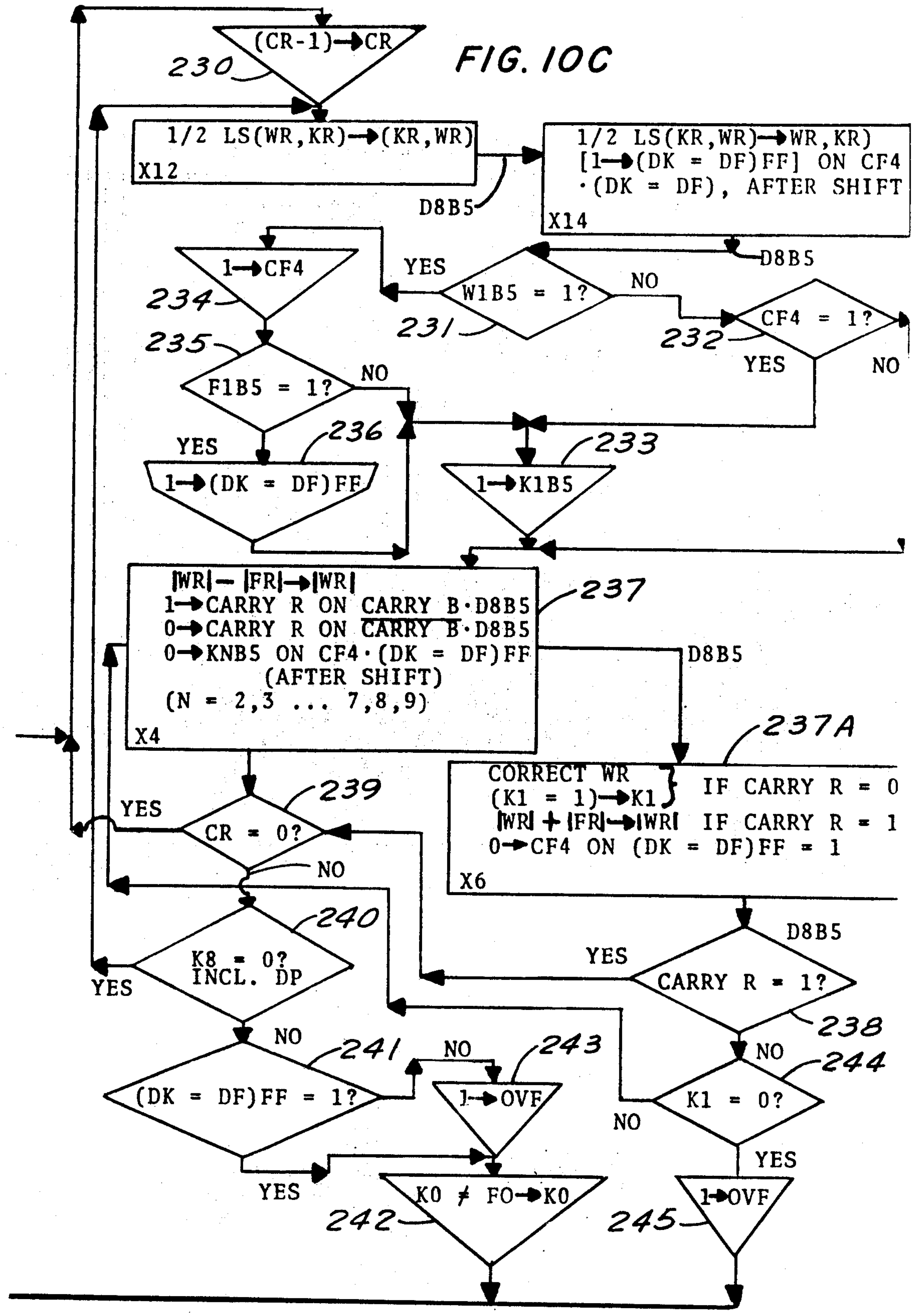

Within the machine, W reg and K Reg are again coupled, basically as in multiplying, but with K Reg shifting left into W Reg in this present instance. During the operation of division, the dividend must be in K Reg and divisor must be in F Reg. For the convenience of the operator, however, the dividend is entered through keyboard 21 before entry of the divisor, as is the general custom, so the machine automatically exchanges F Reg and K Reg upon pressing the "=" key *25d*, to transfer the divisor to F Reg and the dividend to K Reg, although they were entered in the opposite manner. As shown in FIG. 10C, this takes place in state X2B when the new divisor flip-flop NDF =1.

With the divisor properly in F Reg and the dividend in K Reg, the sequence requires a left shift of the coupled registers to bring the most significant dividend digit into W Reg and also requires a counter to indicate the number of times after the shift that the number in F Reg has been subtracted from the number in W Reg before there is obtained a number in W Reg smaller than that in F Reg. Preferably, and in known fashion, the least significant digit position of K Reg is used for quotient digit generation, since each left shift of the coupled registers brings a zero into the least significant digit position of K Reg, thus making it available for use as the aforementioned counter required for quotient development. It will also be quite apparent that there must be a left shift from K Reg into W Reg as successive digits of the quotient are developed. It will be seen in a moment how this takes place, but the point here is that these left shifts take place one order at a time, and each time there is a shift, F Reg is then subtracted from W Reg to see whether it is less than W Reg (and immediately added back if there is an overdraft). Once W Reg is greater than F Reg, then one or more successful subtractions of the amount in F Reg can take place. Obviously it may require a series of left shifts before the number in W Reg is big enough for a successful subtraction to take place.

The decimal point, wherever initially located in F Reg and in K Reg, must be accounted for in the quotient, and this is done in this invention in a very simple manner, again using the fifth bits. In the first place, when the dividend shifts from K Reg into W Reg, and the decimal point (in an eight-digit embodiment) goes from K8B5 to W1B5, a marker bit or pseudo-decimal point is automatically injected at K1B5 (W Reg again will lose the decimal point as such because of the need for correction of false codes during the successive subtractions). From then on, a decimal point is injected at K1B5 on every left shift, and all these markers are retained until the left-most marker in K Reg reaches the same location as the decimal point in F Reg. At that point the markers, other than the one at the K1 position, are eliminated from the machine, identifying this last as the true decimal point. Thereafter, no further markers are injected in K1B5, and the decimal point shifts left with the number, for it is the true decimal point.

In this operation two flip-flops are again very important in the location of the true decimal point in the quotient. One of them is called CF4 and performs a function similar to that performed by CF5 referred to previously in multiplication. It will be noted in FIG. 10A that CF4 is always reset at state X3, and so from state X3 the routine continues with CF4 at zero. The second flip-flop is one which compares the decimal point positions of K Reg with the decimal point positions of F Reg and is therefore known as (DK = DF) FF. This flip-flop is also reset in state X3.

The two flip-flops are related, as shown in the following table:

| Stage | CF4 | (DK = DF) FF |
|---|---|---|
| 1. Initially | 0 | 0 |
| 2. Original K Reg decimal leaves K8 and marker is inserted at K1B5 | 1 | 0 |
| 3. DK = DF | 1 | 1 |
| 4. Final decimal located in K Reg | 0 | 1 |

In stage 1 the original dividend decimal is in K Reg. In stage 2 the digit carrying the original dividend decimal leaves K8 for W1; the digit itself enters W Reg but since W Reg cannot store the decimal because of the necessary corrections after each subtraction, a marker is transferred back to K1B5 of K Reg. In stage 3 the status is reached where the marker (actually the left-most of the series, for reasons of circuit simplification, as mentioned previously) in K Reg is at the same location as the decimal in F Reg, and the marker now injected into K Reg at the K1 position becomes the final decimal point, while all other markers are cleared. In stage 4, the final decimal point is properly located relative to the quotient digits in the K Reg and there are no further decimal manipulations to be done by the machine.

Referring now again to FIG. 10A, it can be seen that states X0, X1, and X3 are the same in division as in multiplication, the CF4 flip-flop also being set to zero in X3 (box 200). States X2A or X2B follow, and it will be noted that what occurs in these states during division differs from what happened in multiplication: in state X2A (box 201) during division, multiply flip-flop MUF is set to zero and the new divisor flip-flop NDF is set to 1, instead of the converse that happened during multiplication. When the machine has again gone through states X0, X1, and X3 on successive occurrences of D8B5, after a new number has been entered in the K Reg to serve as the divisor and the "equal" key has been pressed, then on the next D8B5, state X2B (box 202) is reached and there W Reg is set to zero. Since the new divisor flip-flop NDF was set at 1 in state X2A, the machine now exchanges what is in K Reg with what is in F Reg, so that the number entered first in K Reg and subsequently transferred to F Reg in state X2A following depression of the divide key *25 f*, is now transferred back from F Reg to K Reg while the second-entered number is transferred from K Reg to F Reg to serve as the divisor (the signs of the F and K Regs also being exchanged.

On the next occurrence of D8B5, the new divisor flip-flop NDF is set to zero, so that no further exchanges between F Reg and K Reg can take place in the machine until after the operation is completed, the quotient having been obtained, and only if there is a subsequent entry to X2A. Next, as in multiplication, the question is asked, 203, "Does F8 equal zero?" This question, by the way, does not regard the presence or absence of a decimal point at F8B5. If F8B1 through F8B4 are not all at zero, then the answer is "No," and the same operation that took place for multiplication is followed, namely, the question is asked, 204, whether F1B5 is 1. If it is, there is an overflow and the machine returns to state X0 to await key release. If not, there is a right shift, 206, for one place so that F8 equals a zero and then the operation proceeds.

The next question asked, 207, is, "Is the multiplier flip-flop MUF at 1?" Since the "divide" key 25*f* was pressed, MUF should not be at 1, and this is where the final differentiation between multiplication and division is made, although the following steps, as will be seen, have some similarities.

On division, then, after the indication that the multiplier flip-flop is zero, the counter CR is first decremented, 230 (FIG. 10C), by 1. That is, the counter moves from zero (which corresponds also to 8) to 7, and it will be noted that the counter CR is always initially decremented by 1, as the zero condition of this counter is what enables the machine to tell when all eight digits of the dividend have been transferred from K Reg into W Reg by the series of left shifts performed. In this connection, it should be stressed that the counter CR is not keeping track of the actual division (quotient generation), but only of the number of shifts occurring from K Reg to W Reg.

After decrementing that counter, which takes place before the shift is made, the machine goes to states X12 and X14 which correspond to the shift states in multiplication; once again shifting is done at D8B5 in two cycles rather than in a single cycle, for similar reasons. In state X12 there is what may be considered a hlaf left shift (a one digit delayed interchange, substantially) of K Reg and W Reg, with a zero in W1 and K1-7 in W2-W8, K8 in the left shift buffer 46 and W1-8 in K1-8 (in an eight-digit system). Then, after the next D8B5 there is another half left shift (second interchange, again on digit delayed) of the same registers in state X14, such that W1–W7 are now in W2–W8, K8 is in W1, and K1–K7 are in K2–K8 and the zero now in K1. In this state, also, the (DK = DF) flip-flop is set to 1, when the CF4 flip-flop is 1 and when, after the shift, there is a marker in a K Reg fifth bit position which is in the same order as the decimal point in F Reg. If both these conditions are met, then the machine can set the final decimal point in K1B5, as will be seen.

On the next D8B5, proceeding from state X14 in FIG. 10C, the question is asked, 231: "Is W1B5 = 1?" If W1B5 is 1, that means the K Reg decimal point has been transferred from K Reg to W Reg. If the answer is "No, " meaning there was no transfer of the decimal at that point, the question is next asked, 231, whether CF4 is 1. If it is 1 (as it will be at time of transfer and on eqch left shift after transfer, until DK = DF), then K1B5 is set, 233, at 1. If CF4 = 0, then the operation is either in an early stage before the decimal has reached W1 or else the final decimal point has already been set. In either instance, the machine goes to state X4.

On the other hand, if the answer to the question "Is W1B5 = 1?," above-mentioned, is "Yes," the CF4 flip-flop is set, 234, to 1, and the question is next asked, "Is F1B5 equal to 1?" If it is, that means the decimal point in F Reg is on the extreme right — that is, in the same location as the original decimal point in K Reg — and that the marker about to be set in the K Reg (as will be seen) is actually to be the final quotient decimal point; so that upon a "Yes" answer, the (DK = DF) flip-flop is set, 236, to 1 and K1B5 is set, 233, at 1. If F1B5 = 0, the (DK = DF) flip-flop is not set, but a 1 is still set at K1B5. This means when the initial decimal point at K8B5 in the K Reg has been transferred to the W Reg at W1B5, a marker will be recorded in K1B5 (note also that on every subsequent left shift, another marker will be inserted at K1B5, but these cause no problem, as will be seen). When the left-most marker, the first one entered at K1B5 — subsequently shifted left to K2, K3, etc. — reaches the position coinciding with the position of the decimal point in the F Reg, i.e., DF = DK, a final marker entry is made at K1B5. All markers to the left are then cleared, and what is then the final decimal point thereafter shifts with its number. Until that takes place, the machine keeps entering a marker at K1B5 after each shift in order to have it ready for the final determination. Note that though the marker in K Reg compared with the F Reg decimal position is not usually the final setting, such final setting takes place immediately when the F Reg decimal point is at the F1 position.

As will be recalled (see FIGS. 10B and 10C), the various paths from state X14 to state X4 have been discussed. In this latter state (box 236) during division, the number in F Reg is subtracted from the number in W Reg, and the difference is entered in W Reg. If carry-B flip-flop is 1 at D8B5, carry-R flip-flop 124 is set, whereas if carry-B flip-flop is zero at D8B5, carry-r flip-flop is reset. Also, when the CF4 flip-flop and the (DK = DF) flip-flop are both 1 when in this state X4, then a zero is placed in bit 5 of every digit in K Reg except the first, so that the marker then at K1B5 alone remains and becomes the permanent decimal point, as stated above. Thus, in K2, K3, and so on up through K8, any previously placed markers will be removed by the resetting of all these fifth bits to zero.

On the next D8B5 the machine moves to state X6. In this state, 237, if carry-R is zero (no overdraft), W Reg is corrected and the K1 digit is incremented by 1. Correction of W Reg is performed exactly in accordance with the subtractive corrections of the excess-three system already discussed and, therefore, that description need not be repeated. Incrementation of the K1 digit indicates that the F Reg has been successfully subtracted once from the W Reg. If it was not a successful subtraction — that is, an overdraft occurred, F Reg being larger than W Reg — then the setting of the carry-R flip-flop insures that the number formerly in W Reg is regenerated. If carry-R is set (i.e., at 1), indicating that there was an overdraft, then the number presently in W Reg is added to F Reg and placed back in W Reg so that W Reg is in effect left unchanged from what it was before the attempted subtraction. Note that when overdraft occurs, there is no need for correction of either the overdrafted value or the regenerated value. In other words, by first subtracting the F Reg contents and then adding them back, invalid codes that would evolve from doing only one of those two operations cannot occurs.

In state X6, the CF4 flip-flop is set at zero when the (DK = DF) flip-flop is at 1. This means that the machine has reached stage 4 of the table above, and the final decimal point has been placed in the K Reg.

While the foregoing steps complete the location of the true decimal point, it will of course be recognized that this decimal point may still be shifted to the left (with the digits, of course) one or more times before the complete quotient is obtained.

On the next occurrence of D8B5 the machine leaves state X6, asking the question, 238: "Is Carry-R = 1?" If it is, indicating that one of the quotient digits has been determined (subtractions are counted until an overdraft occurs), then the question is asked, 239: "Is CR equal to zero?" If CR does not equal zero, the routine has gone through one or more quotient digit operations, but not the eight necessary, and must now continue as above until the counter CR does equal zero. The routine goes back to step 230 for decrementing the counter, counts it doen once, then develops through another quotient. If CR does equal zero, then the question is asked, 240: "Is K8 equal to zero, including but 5, that is, including the decimal point?" If it is, there is neither a decimal point nor a digit other than zero in the K8 position, and the machine goes back to the first shift state X12, but without decrementing the counter CR further. The succeeding shifts are done for a different purpose, — namely, generation of a full set of significant quotient digits (eight in the embodiment described).

If K8 does not equal zero, that is, if there is either a digit or decimal point in the K register at this state, the question is asked, 241: "Is the (DK = DF) flip-flop set at 1?" If the answer is "Yes," then the signs of K Reg and F Reg are compared, 242, the result placed in K sign storage, and the machine goes back to state X0. If the answer is "No," the overflow signal is given, 243, and the signs are again compared and the machine On leaving state X6 at D8B5, if carry-R does not equal 1, the question is asked, 244: "Is K1 zero?". If not, then there is a return to the state X4 (box 236) for another subtraction and to X6 (box 237) for another incrementation of the number in the K1 position of K Reg, this loop continuing until an overdraft is obtained in X4 and corrected in X6, the count in K1 then indicating the correct quotient for that particular digit. Once that count is obtained, as has been described, the machine goes back to the very beginning of the purely divisional sequence, decrements the counter once again, performs another left shift, and does another series of subtraction operations as needed.

It should be noted that if the question, 244, "Is K1 equal to zero?" is answered with a "Yes", an overflow signal is generated, 245, and the machine is returned to state X0. This question can be answered "Yes" during the series of subtractions performed in X4 and X6 only when the divisor in F Reg is zero, and, of course, this indicates the well-known mathemaical anomaly; hence, the signal for overflow used as a general error signal in this embodiment is properly given.

The structure providing the above-described decimal controls during division will next be described in some detail, although that for the actual division will be limited to just so much as is pertinent to clearer explanation of the decimal controls.

As will be recalled from the foregoing general description, the divident number (first factor) and the divisor number (second factor) are located in F Reg and K Reg, respectively, when the division calculation is initiated on depression of the "equals" key *25d*. In state X2B (box 202), then, as a first step, the contents of F Reg and K Reg are interchanged unless the problem does not involve a new divisor, indicated by the reset condition of flip-flop NDF. This is shown in FIG. 4 and FIG. 8 where the stream selectors 44 and 167, respectively, each have a two-input AND gate for the purpose. AND gate 161 (FIG. 4), connected to stream selector 44, is supplied with the F Out signal on line 159 and a signal F ⇄ K ("Interchange F and K") on line 162 from a NOR gate 163 (FIG. 8). The inputs to gate 163 are the inverted output of flip-flop NDF and the inverted output of a NAND gate 164. This latter gate is supplied with the output of the X2 state of Sequence Controls 35 and the set condition of the "equals" flip-flop EQF. Similarly, AND gate 165 is connected to stream selector 167 and is supplied with the K Out signal on line 37 and with the output of OR gate 166. OR gate 166 has two inputs, one on line 162 from NOR gate 163 and the other from an AND gate 168 having two inputs, one from the X2 state of Sequence Controls 35 and the other a signal T/D from the OR-gated output of the times or divide keys *25 e*, *25f* (OR gate not shown).

Because the dividend is then in K Reg 40 and the divisor in F Reg 160, and the coupling of K Reg 40 and W Reg 96 allows joint shifting of the latter two, left shifting of K Reg into W reg one step at a time can be achieved readily and F Reg then subtracted from W Reg, the number of successful subtractions being counted in the least significant digit position of K Reg, which becomes available for such counting with each left shift. As was seen from FIG. 10C, the left shifting of the double-length register is performed again in two half-shifts, the first in X12 and the second in X14. The logic elements for doing this are shown in FIGS. 4 and 8. In FIG. 4, stream selector 44 determines which input goes to K Reg and is provided with the W Out data on line 97 through two-input AND gate 98, as described previously in connection with multiplication. The S4 input on line 36 being true for both multiplication and division and both X12 and X14, presence of this signal through OR gate 49 will enable passage of the W Out signal into K Reg through gate 98. Similarly, as shown in FIG. 8 and again being the same as in multiplication except for the direction of shift, the S4 signal on line 36 enables the output KLS on line 59 from left-shift register 46 to pass through an Exclusive OR combination of gates into W Reg, the combination comprising NOR gate 169 having KLS as one input and the set condition of flip-flop MU as the other input, the output of NOR gate 169 being the second input to the NOR gate 170 which was supplied by AND gate 91 as its first input, as previously described under multiplication. The output of NOR gate 170 goes to W In under control of the S4 output of Sequence Controls 35 (this control being established, for instance, by means of the AND gate shown but not numbered, as it is actually part of the stream selector 93). The left shifting of the coupled registers in division must be accompanied by entry of a zero in K1, the rightmost position of K Reg 40. This is accomplished during the first half-shift in X12 when the shifted K Reg contents are being exchanged with W Reg contents, as shown by a "0→W" input on line 171 to stream selector 93 controlled by the (Bi+B2) signals on line 31. The "0→W" signal comes from an OR gate 172, and is generated in this case by an output from a four-input AND gate 173 which is open only during D1 time (i.e., when a signal appears on line *32a*) when there is a signal on the S4 and S2 outputs of Sequence Controls 35 and the MU flip-flop is in its reset condition. Thus, only during state X12 of division will there by an output from AND gate 173 at D1 time. The (B1 + B2) signal will allow entry of "1's " into W Reg at those bit times, while 0's" will be entered during B3, B4 and B5 times because the "0 → W" signal will inhibit any other input to stream selector 93, in known fashion.

Figure 13:
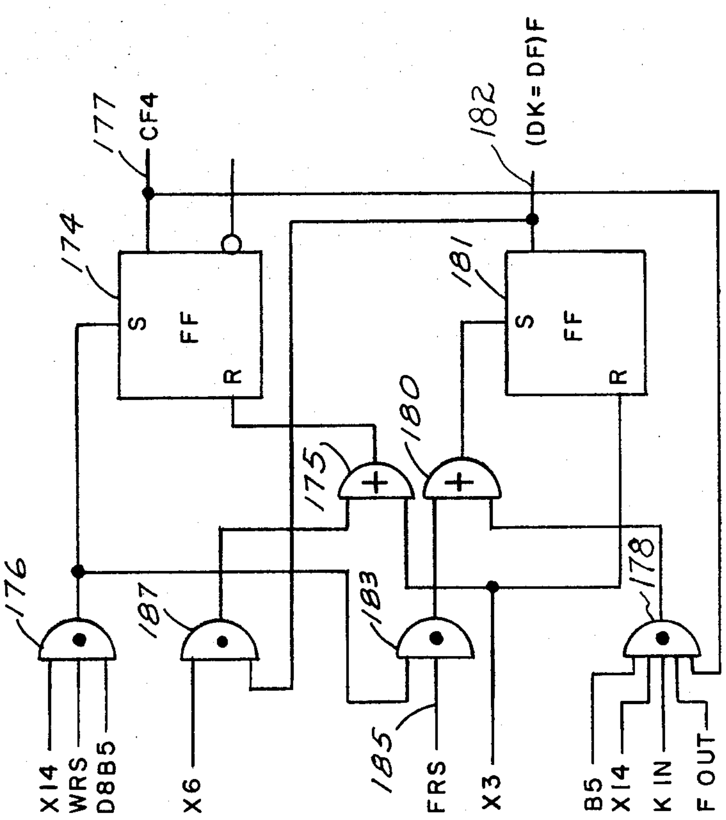
FIG. 13 is a logic diagram showing the decimal controls for division.

As stated previously, the decimal control in division involves placement of a marker in K Reg and then comparison of that marker's ordinal location with the ordinal location of the decimal point in F Reg, the same structure as was used in multiplication being used also in division. The comparison cannot be performed while the divident decimal point is in K Reg, so shifting of that decimal point into W Reg is used to flag the entry of the marker into K Reg and initiate the comparison by means of structure now to be described in connection with FIG. 13.

A dynamic flip-flop 174 generates a signal $\overline{CF4}$ in its rest condition, reset by the X3 state signal from Sequence Controls 35 through a two-input OR gate 175, discussion of the other input being taken up later. Flip-flop 174 will set at the end of state X14 and D8B5 time through a three-input AND gate 176 under the control of WRS, the right-shifted W Reg signal on line 101. Flip-flop 174 differs from the previously-mentioned decimal control flip-flops in that setting occurs immediately, while resetting occurs only after one bit of delay.

With flip-flop 174 set, the CF4 output on line 177 will become true during D8B5 with several results. First, since setting occurs immediately, a signal will pass at the same time through an AND gate 184 connected (FIG. 4) to one input of the OR gate 41 at the entry to five-bit register 42 forming part of K Reg 40. Thus, the left-shifted K Reg contents having been returned from W Reg in X14, a zero therore being in buffer 42 because of the left shift, as D8B5 time a 1" will enter in the fifth bit position of buffer 42, corresponding to the desired K1B5 entry. Note that for simplicity, the same thing will again occur on each pass through state X14 thereafter until coincident location of the first marker and the decimal point in F Reg is detected, as will next be described.

As a second result of the setting of flip-flop 174, there is enabled a five-input AND gate 178, which will pass a signal to a two-input OR gate 180, provided all of the other four inputs are true. Gate 180 is connected to the set input of a flip-flop 181, which responds without any delay, just as does flip-flop 174. The other inputs to gate 178 are the B5 signal from bit counter 28, the X14 state of Sequence Control 35, the K IN signal from stream selector 44 and the F Out signal on line 159. It will be recalled that at the start of X14, the left-shifted K digits are in the first part of W Reg and a 0 is in the five-bit part 90, hence K In will be supplied thw W Out signals on line 97 to complete the shift, these signals passing through AND gate 98 enabled by the S4 signal through OR gate 49, previously described. Thus, detection of the coincidence of the marker in a K digit and decimal point in F Reg during X14 — that is, simultaneous presence of a signal from stream selector 44 and from register 160 — will cause a signal to pass through gate 178 to set flip-flop 181 giving rise to a (DK = DF0 F signal on line 182, the output of flip-flop 181. Because of the possibility of the decimal point being in the fifth bit of the first digit of F Reg, flip-flop 181 is also set through the other input ot OR gate 180, supplied with the output of an AND gate 183 having the output of AND gate 176, described earlier, as one of its two inputs, and the right-shifted or "early scan" output FRS Of F Reg 160 on line 185 as the other input.

The effect of sensing the above coincidence is to indicate that the last entered decimal point is the true decimal point; hence, the original marker and all succeeding ones except the one in K1B5 must be removed, as mentioned previously. This is done at the end of that state X14 in which coincidence of the left-most marker in K and the decimal point in the corresponding oridnal position in F Reg is detected and makes use of the 0 →K circuitry mentioned previously for entering 0's " in K Reg during clearance, digit entry, etc. The "0→K" circuitry comprises a two-input AND gate (not numbered, but marked with an "S" to show that it is part of stream selector 60), a data input from line 31, the (B1 + B2) signal from bit counter 28, and a control input from a three-input OR gate 63. Two of the inputs to this OR gate relate to initial clearance, in response to a signal on line 36, and to a 0→K signal on line 55 (FIG. 6) which causes preclearance of K Reg 40 and shift register 46 during digit entry, the "1's" in the first two bits of excess-three code for a zero being entered through the unnumbered AND gate forming part of stream selector 60, similar to other zero entries previously described. The element for removing the superfluous markers comprises a four-input AND gate 186 (FIG. 4) with output connected through the third input of OR gate 63 to stream selector 60 which selects between the output of stream selector 60 and the output of OR gate 63. The inputs to gate 186 come from the CF4 output of flip-flop 174 on line 177, the DK = DF output of flip-flop 181 on line 182, the inverted output D1 from bit counter 28. Thus, when DK = DF flip-flop 181 is set at the end of state X14, during the immediately following state X4, stream selector 60 will block passage of fifth bit information into K Reg (i.e., "write" zeros in that bit) at all digit times except D1 and thus attain the desired objective. The reason for this is that, as will be recalled, each control signal goes to the stream selector (even though not shown, to simplify the drawing), and inhibits input from all other data streams (by a signal to the control input of a Nor gate, say), thus a signal from AND gate 186 through OR gate 63 will close stream selector 60 to input from stream selector 44, but only at B5 time. The signal from gate 186 will have no other effect, because though the unnumbered AND gate is enabled that gate can only pass signals B1 or B2.

To assure that marker clearance will happen only once (further shifting may move the decimal point into other digit positions subsequently) in state X6, the "correction" state following a subtraction in state X4 — which is the progression always followed — flip-flop 174 will be reset by a signal from a two-input AND gate 187 connected to the other input to OR gate 175, previously described. Gate 187 will give this signal because its inputs, one from the state X6 output of Sequence Controls 35 and the other connected to line 182 from the output of flip-flop 181, will both be true. the reset signal will be available early in X6, i.e., before the first B5. With flip-flop 174 reset, there will be no signal on line 177 and, thus, no further erasures of the fifth bit positions of K Reg, the true decimal point thus being protected as it shifts left with the quotient digits in process of development.

As a last general comment, it should be mentioned that, though not shown, a decimal point is entered in the A Reg 131 and the F Reg 160 when the signal ICC is generated as a result of turning on the machine, as mentioned previously. That entry is made at D8B5 in each case through a NOR gate at the exit of the 35 bit delay forming the major part of each register, in fashion similar to the use of NOR gate 65 for entry of the decimal point in K Reg 40. The decimal point entered in the A Reg is duplicated in the W Reg, because the ICC signal sets the Sequence Controls 35 to the X2 state, and the A Reg contents will be dupllicated in W REg during the first cycle in XO as part of the normal progression to the rest state X1.

The background for elements such as the counters, adders, gating, etc. may be found in "Arithmetic Operations in Digital Computers" by R. K, Richards, D. Van Nostrand, Inc., 1955. Implementation of such elements by NOR and NAND logic is covered in "The Logic Design of Transistor Digital Computers" by Gerald Maley and John Earle, Prentice-Hall, Inc., 1963. The display could be one based on use of cold-cathode numerical indicator tubes and using the "anode scanning dynamic display", an eight-digit version readily adaptable to the embodiment of this invention being described in copending application Ser. No. 853,738 "Dual Key Depression for Decimal Position Selection" by John C. Clark et al. filed Aug. 28, 1969 now U.S. Pat. No. 3,622,768.

In summary, the present invention contemplates use of an extra bit position in every order of binary-code storage or accumulating registers not only for storage of a radix point, but also for storage of control information relative to correction of false intermediate arithmetic results of operation on the codes. After correction the radix point may be replaced in the results by copying the radix point from another register, the contents of which were aligned with those of the result register, or by manipulations of information in the extra bit position of one register exclusive of the result register the extra bit position of the latter being reserved for storage of correction control information, as described above. The invention provides particularly simple means for determination of the proper location of the radix point in products and quotients, utilizing the extra bit positions in only one of the three registers needed for storage of the two factors and the result. More specifically, the invention relates to a five-bit binary coded decimal system, with a decimal point or carry/borrow information stored in the fifth bit positions, and to correction of flase intermediate codes resulting from operations on data using the excess-three code, these corrections being performed in identical fashion whether the results come from adding or subtracting the data, by reversing the significance of the fifth bit information as between carries and borrows.

In light of the above-described embodiments, it will be evident to those skilled in the art that the present invention is susceptible of other modifications, substitutions, etc. and such are intended to be within the scope of the invention, it being defined only by the appended claims.

WHAT IS CLAIMED IS:

1. A calculator of the digital type including in combination:

a pair of data registers, each having a plurality of orders for storing digital data, each order having $n+1$ bits, $n$ of said bits as a group expressing a digit and including a least significant bit and a most significant bit, means for storing a radix point in each register as a predetermined binary value in the remaining bit of the order in which there is stored the digit associated with said radix point, operation initiating means.

means for radix point alignment of the data in said pair of registers in response to said initiating means, means for performing arithmetic operations on the data in said pair of registers in response to said initiating means and subsequent to said alignment, said operations involving interdigit carries or borrows and the results of said operations being stored in a particular one of said pair of registers in the form of false n-bit groups for each result digit, and said arithmetic operations means comprise means for performing said interdigit carries or borrows through the remaining bit of each order, said carry or borrow being effective between the most significant bit of the digit in a given order and the least significant bit of the digit in the next higher order, and for recording said carry or borrow as a binary value in said remaining bit of said given order, means for correction if each false n-bit group after a said arithmertic operation, according to the value in the remaining bit of each order in said particular register, and means responsive to the remaining bits in each order of the other of said pair of registers for recording identical values in the remaining bits of said particular register after correction of said false n-bit groups.

2. A calculator as defined in claim 1 wherein said remaining bit is the most significant in a sequence of $(n+1)$ bits.

3. A calculator as defined in claim 2, wherein said calculator is of the binary-coded decimal type, each order of said registers comprising five binary bits, four bits of which are used to express a decimal digit; said radix point being a decimal point stored as a "1" in the fifth bit of said order storing the associated digit; and said binary value for an interdigit carry or borrow being recorded over said stored decimal point in response to occurrence of said carry or borrow in the order where said decimal point is stored.

4. A calculator as defined in claim 3, wherein the binary-coded digits are stored in excess-three code, and said correction means comprise means enabled during an addition; and operable to add a three to a false bit group if there was an interdigit carry and for subtracting a three if there was not.

5. A calculator as defined in claim 3, wherein the binary-coded digits are stored in excess-three code, and said correction means comprise means enabled during subtraction and operable to subtract a three from a false bit group if there was an intergidit borrow and for adding a three if there was not.

6. A calculator as defined in claim 3, wherein said means for performing said interdigit carries or borrows further include means enabled during an addition and storing a particular one of the binary values in said fifth bit of a respective order if there was a carry from that order, and the other of said binary values if there was not; and means enabled during subtraction and storing the other of said binary values in said fifth bit of a respective order if there was a borrow propagated from that order, and the particular one of the binary values if there was not.

7. A calculator as defined in claim 3, wherein said means for performing said interdigit carries or borrows further include means enabled during an addition and storing a "1" in said fifth bit of a respective order if there was a carry in that order, and a "0" if there was not; and means enabled during subtraction and storing a "0" progated from said fifth bit of a respective order if there was a borrow in that order, and a 1" if there was not.

8. A calculator as defined in claim 3, wherein said operation initiating means include a set of manually depressible function keys and said radix point storing means include a manually depressible decimal point key, and further including means for automatically entering a decimal point at the order storing the rightmost digit of an entered number upon depression of a function key of said set, and means disabling said automatic decimal point entry means upon depression of said decimal point key prior to depression of a function key of said set.

9. A calculator of the binary-coded digital type including in combination:

a set of registers for storing coded digits in a plurality of orders, each order having five binary bits, four of said bits being used to express a coded digit, means for entering coded digits in one of said registers, means for entering a radix point in said one register following entry of any one said digit of a number, said radix point being entered as a "1" in the remaining bit of the order wherein said one digit is stored, means for performing arithmetic operations on digits of said one register, said operations involving intergit carri or borrows and the result digits obtained from said operation being stored in an other of said registers in the form of *f* four-bit codes, and said arithmetic operations means comprise means for performing said interdigit carries or borrows through the remaining bit of each order, said carry or borrow being effective between the most significant bit of the digit code in any given order and the least significant bit of the digit code in the next higher order, and a binary value being recorded in said remaining bit of the given order as an indication of each carry or borrow, means for correction of each false code after a said arithmetic operation, according to the binary value in the remaining bit of each order in said other register, and means responsive to the radix point information in the remaining bits in the orders of said one register for storing a radix point relative to said result digit codes in said other register subsequent to correction of the false codes.

10. A calculator as defined in claim 9, wherein each binary code identifies a decimal digit, said remaining bit is the fifth bit of each order, and the radix point is a decimal point stored as a 1" in the fifth bit of the order storing said one digit, and further including means effective subsequent to said correction and said storing of a radix point relative to said result digit codes, and responsive to the data in said other register for displaying the result digits with said decimal point properly located.

11. A calculator as defined in claim 9, wherein the binary-coded digits are stored in excess-three code, and said correction means comprise means enabled during an addition and operable to add a three to a said false code if there was an interdigit carry and for subtracting a three if there was not.

12. A calculator as defined in claim 9, wherein the binary-coded digits are stored in excess-three code, and said correction means comprise means enabled during a subtraction and operable to subtract a three from a said false code if there was an interdigit borrow and for adding a three if there was not.

13. A calculator as defined in claim 9, wherein said means for performing said interdigit carries or borrows further include means enabled during an addition and storing a particular one of the binary values in said fifth bit of a respective order if there was a carry from that order, and the other of said binary values if there was not; and means enabled during subtraction and storing the other of the binary values in said fifth bit of a respective order if there was a borrow propagated from that order, and said particular one of the binary values if there was not.

14. A calculator as defined in claim 9, wherein said means for performing said interdigit carries or borrows further include means enabled during an addition and storing a "1" in said fifth bit of a respective order if there was a carry from that order, and a "0" if there was not; and means enabled during subtraction and storing a "0" in said fifth bit of a respective order if there was a borrow propagated from that order, and a "1" if there was not.

15. A calculator of the digital type including in combination:

two factor registers and a working register, each said register having a plurality of orders for storing digital data, each order having $(n+1)$ bits, $n$ of said bits as a group expressing a digit, means for entering said digital data in said registers, means for storing a radix point in each register as a predetermined binary value in the remaining bit of the order in which there is stored the digit associated with said radix point, means for performing a multiplication of the data in a first of said factor registers by the data in the second of said factor registers, partial products being developed in said working register, means to transfer said partial products to said first factor register during said multiplication, first means sensing values in the remaining bits in said first factor register to determine the location of said radix point relative to the data therein, second sensing means responsive to the location of the radix point in the second factor register, means responsive to said first sensing means and operable to enter said predetermined binary value as a marker in the remaining bit of a selected order of said first factor register, said order selection being controlled by said second sensing means, and means responsive to the sensing of said marker by said first sensing means and operable to store said predetermined binary value in a particular order of said first factor register, to place thereby a true radix point in proper relation to said transferred partial product.

16. A calculator as defined in claim 15, wherein said multiplication means include means for shifting the contents of said working register and first factor register, and said first sensing means comprise gating which passes a first signal upon sensing that said predetermined value has been shifted into the remaining bit of a given order of the first factor register, said marker entry means being responsive to said first signal and effective to enter said marker in the remaining bit of an order identical to that order wherein a radix point is stored in said second factor register; said gating passes a second signal when the marker is in turn shifted into the remaining bit of the given order; and said true radix point storing means is responsive to the second signal.

17. A calculator as defined in claim 16, wherein said given order is the least significant order of the first factor register and said particular order is the most significant order of that register.

18. A calculator as defined in claim 15, and further including means to erase said marker in response to sensing thereof by said first sensing means.

19. A calculator of the binary-coded decimal type including in combination:

a set of digit keys, a decimal point key, a multiplication key, and an "equals" key, a keyboard register, a working register and a factor register, each of said registers having first and second ends and containing a plurality of orders for storing digits, each order having five binary bits, four bits of which are used to express a decimal coded digit, means responsive to a pressed digit key to enter the corresponding binary code in the keyboard register, means for entering a decimal point in the keyboard register upon pressing the decimal point key subsequent to entry of any one digit of a number, the decimal point being entered as a predetermined binary value in the fifth bit of the keyboard register order where said one digit is stored, means for transferring a first-entered number from the keyboard register to the factor register upon depression of the multiplication key, whereby a second number can be entered in the keyboard register while the first-entered number is stored in the factor register, means for coupling the working register as an extension to the keyboard register, means for performing a multiplication upon depression of the "equals" key, comprising successive additions of the factor register contents to the working register contents according to the value of the digit at one extreme in the keyboard register, then shifting the contents of the coupled working and keyboard registers by one order so that the next-to-extreme digit near said first end of the keyboard register becomes a new extreme digit of the keyboard register, and the corresponding extreme digit in the working register enters an order at said second end of the keyboard register; and again performing additions of the factor register to the working register, as before, governed by the value of the new extreme digit of the keyboard register, means for detection of shifting the fifth bit binary value out of the keyboard register, means for inserting said predetermined binary value into the keyboard register as a marker at the fifth bit of the order corresponding to the location of the decimal point in the factor register, said insertion occurring in response to detection of said shifting out, and means for inserting said binary value in the fifth bit of a particular position of the keyboard register as a true decimal point relative to the product, in response to detection of the shifting out of the marker binary value.

20. A calculator as defined in claim 19, wherein said first and second ends are right and left ends, respectively, and said additions depend on the value of the digit at the extreme right in said keyboard register, said shifting occurs to the right, said marker insertion is made when the original keyboard register decimal point has just been shifted out to the right, and said particular position for insertion of the true decimal point is the extreme left digit poisition of the keyboard register.

21. A calculator of the binary-coded decimal type including in combination:

a set of digit keys, a decimal point key, a division key, and an "equals" key, a keyboard register, a working register and a factor register, each of said registers having right and left ends and containing a plurality of digit storage orders, each order having five binary bits, four bits of which are used to express a decimal coded digit, means responsive to a pressed digit key to enter a corresponding binary code in the keyboard register, means for entering a decimal point in the keyboard register upon pressing the decimal point key subsequent to entry of any one of the digits of a number, the decimal point being entered as a "1" in the fifth bit of the order where said one digit is stored, means for transferring a first-entered number from the keyboard register to the factor register upon depression of the division key, whereby a second number can be entered upon the keyboard register while the first-entered number is stored in the factor register, means for interchanging the factor and keyboard registers upon pressing the "equals" key after entering said second number when performing division, said interchange placing the dividend in the keyboard register and the divisor in the factor register, means for coupling the working register as an extension to the left of the keyboard register, means for performing a division after said interchange comprising successive subtractions of the factor register contents from the working register contents whenever and for as long as the number in the working register is greater than the number in the factor register and entering the number of such subtractions at the extreme right of the keyboard register, then shifting the coupled registers to the left and repeating the process to generate successive quotient digits, there being at least as many left shifts as there are orders in the keyboard register, means for detecting of the shifting of the fifth bit binary value out of the keyboard register upon a said left shift, means for inserting said predetermined binary value as a marker in the fifth bit of the extreme right order of the keyboard register in response to detection of said shifting out, means providing a signal upon sensing that the marker is in corresponding to the location of the decimal point in the factor register, means responsive to said signal and effective to erase the inserted marker, and to insert a true decimal point in the fifth bit of a particular position of the keyboard register.

22. A calculator as defined in claim 21, wherein said marker inserting means insert additional markers in said extreme right order of the keyboard register at every left shift subsequent to said shift out controlled insertion, said sensing-means are responsive to detecting that the first marker has reached the same location as the decimal point in the factor register, and said erasing means remove all the inserted markers except the latest one inserted in response to detection by said sensing means that said first marker is in the order corresponding to the location of the demical point in the factor register and means responsive to the bits of information stored in the keyboard register orders, including said fifth but, subsequent to said removal of all but one marker and effective for displaying the final quotient with the decimal point properly located in the display.

23. A calculator of the binary-coded decimal type including in combination:

a set of digit keys, a decimal point key, and a pair of function keys for controlling addition and subtraction, a keyboard register and a working register, each of said registers containing a plurality of digit storage orders and each order having five binary bits, four bits of which are used to express a decimal coded digit, means responsive to depressions of a digit key to enter a corresponding code in the keyboard register, means for entering a decimal point in the keyboard register upon pressing the decimal point key subsequent to entry of any one of the digits of a number, the decimal point being entered as a "1" in the fifth bit of the keyboard register order where said one digit is stored, means operable in response to depression of either one of said pair of function keys and automatically aligning each newly entered number in the keyboard register with a previously-entered number in the working register so that their decimal points are in the same location, by shifting one of the two numbers if they are not so aligned upon entry of the newly entered number, means operable subsequent to said alignment and combining the number from the keyboard register albegraically with whatever number is in the working register upon depression of either of said pair of function keys said combination producing a result with proper sign, said sign being determined in part by whether said newly-entered number was followed by depression of the function key controlling addition or that key controlling subtraction, but with said result having false codes for each digit thereof, and said combining means comprising means for carrying and borrowing between the fourth bit of any one order and the first bit of the next higher order, said carrying and borrowing being effected through the fifth bit of said one order and a binary value being recorded in said fifth bit as an expression of said carry or borrow, means for correction of the false coded digit in each order of the working register after an addition or subtraction, according to whether said combination resulted in a carry or borrow in the respective order and the binary value expression in the fifth bit of the respect order, and means responsive to the fifth bit information in said keyboard register for recording identical information in the fifth bits of said working register subsequent to correction of said falsely coded digits.

24. A calculator as defined in claim 23, further including a totaling key and an accumulator register, means for transferring to the accumulator register the number appearing in the working register after correction and insertion of the decimal point information, means for copying the number in the accumulator register into the working register, and means actuated upon pressing the totaling key for transferring the sum from the working register to the keyboard register, and displaying the algebraic sum.

25. A calculator of the digital type including in combination:

a pair of data registers, each having a plurality of orders for storing digital data, each order having $n + 1$ bits, n of said bits as a group expressing a digit and including a least significant bit and a most significant bit, means for performing arithmetic operations on the data in said pair of registers, said operations involving interdigit carries or borrows and the results of said operations being stored in a particular one of said pair of registers in the form of false n-bit groups for each digit, and said arithmetic operations means comprise means for performing said interdigit carries or borrows through the remaining bit of each order, said carry or borrow being effective between the most significant bit of the digit in any one order and the least significant bit of the digit in the next higher order, and for recording said carry or borrow as a binary value in said remaining bit of said one order, and means for correcting each false n-bit group after a said arithmetic operation, according to the value in the remaining bit of each order in said particular register.

26. A calculator as defined in claim 25 wherein said remaining bit is the most significant in a sequence of (n+ 1) bits.

27. A calculator as defined in claim 26, wherein said calculator is of the binary-coded decimal type, each order of said registers comprising five binary bits, four bits of which are used to express a decimal digit, and said interdigit carry or borrow being recorded as a predetermined binary value in the fifth bit.

28. A calculator as defined in claim 27, wherein the binary-coded digits are stored in excess-three code, and said correction means comprise means enabled during addition, and operable to add a three to a said false n-bit group if there was an interdigit carry and for subtracting a three if there was not.

29. A calculator as defined in claim 27, wherein the binary-coded digits are stored in excess-three code, and said correction means comprise means enabled during subtraction, and operable to subtract a three to a said false n-bit group if there was an interdigit borrow and for adding a three if there was not.

30. A calculator as defined in claim 27, wherein said means for performing said interdigit carries or borrows further include means enabled during an addition and storing a particular one of the binary values in said fifth bit position of a respective order if there was a carry from that order, and the other of said binary values if there was not; and means enabled during subtraction and storing the other binary value in said fifth bit of a respective order if there was a borrow propagated from that order, and the particular binary value if there was not.

31. A calculator as defined in claim 27, wherein said means for performing said interdigit carries or borrows further include means enabled during an addition and storing a "1" in said fifth bit of a respective order if there was a carry from that order, and a "0" if there was not; and means enabled during a subtraction and storing a "0" in said fifth bit of a respective order if there was a borrow propagated from that order, and a "1" if there was not.

32. In a calculator of the binary-coded decimal type, the combination of a keyboard having digit keys, a decimal point key, and a set of function keys, a pair of factor registers and a working register, each of said registers having a plurality of orders for storing digits and each order having $(n + 1)$ bits, $n$ of said bits being used to express a decimal coded digit, means to enter a binary value in the remaining one of said bits at a respective order of each said register to represent respective decimal point information, means for performing arithmetic operations on the data in a pair of said registers, the arithmetic operations being effected with said working register, and the results being placed in one of said pair of registers with displacement of the data therein, means responsive to the displaced decimal point information of said one register and operable to enter said binary value as a marker in the remaining one bit at a particular order of the one register, means for detecting appearance of said marker in a discrete order of said one register upon said displacement, and means operable to enter said binary value in the remaining one bit at a selected order of said one register as the true decimal point relative to the results placed in said one register in response to said means detecting appearance of the marker.

33. A calculator is defined in claim 32, wherein each register has first and second ends, the working register and said one register are coupled to form a single register, the arithmetic operation is a multiplication, partial products being developed by repeat addition of the contents of the other of said pair of registers to the contents of said working register according to the value of successive digits in said one register, the partial product corresponding to each digit being successively shifted by one order into said one register with simultaneous displacement of the information therein; said means responsive to the decimal point in the one register comprise means to detect a first appearance of said binary value in the remaining one bit of a first end order of said one register and means responsive to said detection and operable to enter said binary value as the marker in the remaining one bit at an ordinal position of the one register corresponding to the ordinal position of the decimal point in said other register; said means to detect said marker and enter the true decimal point comprise means defining detection of a second appearance of said binary value in the remaining one bit of said first end order of the one register, and said selected order is the second end order of said one register.

34. A calculator is defined in claim 33, said orders further including a rightmost and a leftmost order, and wherein there are five bit positions per order, said decimal point information being stored as a "1" in the fifth bit, and said first end order and second end order are the rightmost and leftmost orders of the one register, respectively.

35. A calculator as defined in claim 32, said orders further including a right most order and wherein the working register and said one register are coupled to form a single register; the arithmetic operation is division, quotient digits being developed by counting the number of successful subtractions of the contents of the other of said pair of registers from the contents of said working register as the contents of said one register are left-shifted into the working register one order at a time, each said quotient digit being stored in the rightmost order of the one register, vacated on each shift; said means responsive to the decimal point in the one register comprise means responsive to left-shifting of said binary value of the one register into the rightmost order of the working register and operable to enter said binary value as a marker in the remaining one bit of said rightmost order of the one register; said marker detection means are responsive to the left-shifting of the marker into the remaining one bit of an order of the one register corresponding to the order of the other register having the binary value stored in the remaining one bit thereof; and the true decimal point entering means are operable to enter the binary value in the remaining one bit of the rightmost order of the one register and to remove the marker.

36. A calculator as defined in claim 35, wherein there are five bits per order, said decimal point information being stored as a "1" in the fifth bit.

* * * * *

UNITED STATES PATENT OFFICE
CERTIFICATE OF CORRECTION

Patent No. 3,757,097 Dated September 4, 1973

Inventor(s) Han Kuijsten

It is certified that error appears in the above-identified patent and that said Letters Patent are hereby corrected as shown below:

Col. 1, lines 32 & 33, after "2,853,696" and "2,947,748" and "3,391,391", insert a semicolon Col. 2, line 24, change "th" to -- the --
line 62, change "than" to -- then --

Col. 4, line 7, change "indications" to -- indicated --
line 43, change "plug" to -- plus --

Col. 6, line 2, change "iwth" to -- with --
line 58, change "an" to -- and --

Col. 7, line 33, change " "326;" " to -- "326.", --

Col. 10, line 34, change "inptus" to -- inputs --
line 57, change "Rest" to -- Reset --
line 66, insert a comma after "working register"

Col. 11, line 21, change "lien" to -- line --
line 23, change "air" to -- are --
line 32, change "omes" to -- comes --

Col. 13, In the equation, change "Ko", both occurrences, to -- KO --

Col. 15, line 23, change "not" to -- no --

Col. 18, line 63, change "35" to -- 135 --

Col. 21, line 16, change "shift" to -- shifted --

Col. 22, lines 13 & 52, change "produce" to -- product --

Col. 23, line 8, change "incorrespondence" to -- in correspondence --
line 15, change "hav" to -- have --

Col. 25, line 59, after "that,", insert -- though, --

ORM PO-1050 (10-69)

USCOMM-DC 60376-P69
☆ U.S. GOVERNMENT PRINTING OFFICE : 1969 O—366-334.

UNITED STATES PATENT OFFICE
CERTIFICATE OF CORRECTION

Patent No. 3,757,097 Dated September 4, 1973

Inventor(s) Han Kuijsten

It is certified that error appears in the above-identified patent and that said Letters Patent are hereby corrected as shown below:

Col. 28, line 3, change "ime" to -- time --
line 5, after "condition", change the period to a comma
line 15, change "K1B5" to -- K1B3 --

Col. 30, line 8, change "K1B5" to -- K8B5 --

Col. 33, line 30, change "on" to -- one --
line 47, change "eqch" to -- each --

Col. 34, line 22, change "carry-r" to -- carry-R --

Col. 35, line 6, change "doen" to -- down --
line 8, change "but" to -- bit --
line 24, after "machine", insert -- sent back to state XO. --

Col. 36, line 54, change "(Bi+B2)" to -- (B1+B2) --
line 59, change "S2" to -- $\overline{S2}$ --

Col. 37, line 7, change "divident" to -- dividend --
line 29, change "therore" to -- therefore --
line 30, change "as" to -- at -- and change " 1" " to -- "1" --
line 44, change "K IN" to -- K In --
line 48, change "thw" to -- the --
line 57, change "(DK = DFO F" to -- (DK = DF)F --
line 64, change "Of" to -- of --

Col. 38, line 7, change " 0's" " to -- "0's" --
line 28, change "D1" to -- $\overline{D1}$ --
line 54, change "the", second occurrence, to -- The --

Col. 39, line 5, change "W REg" to -- W Reg --
line 44, change "flase" to -- false --

PO-1050 (10-69)

USCOMM-DC 60376-P69
☆ U.S. GOVERNMENT PRINTING OFFICE : 1969 O—366-334.

UNITED STATES PATENT OFFICE

CERTIFICATE OF CORRECTION

Patent No. 3,757,097 Dated September 4, 1973

Inventor(s) Han Kuijsten

It is certified that error appears in the above-identified patent and that said Letters Patent are hereby corrected as shown below:

Col. 40, line 21, change "if" to -- of --
line 46, after "addition", delete the semicolon Col. 41, line 5, change "progated from" to -- in --
line 6, change "in" to -- propagated from --
line 33, change "carri" to -- carries --
line 35, change "f" to -- false --

Col. 46, line 6, change "respect" to -- respective --

Signed and sealed this 23rd day of July 1974.

(SEAL)
Attest:

McCOY M. GIBSON, JR.
Attesting Officer

C. MARSHALL DANN
Commissioner of Patents

ORM PO-1050 (10-69)

USCOMM-DC 60376-P69
☆ U.S. GOVERNMENT PRINTING OFFICE : 1969 O—366-334.